(12) United States Patent
Bouqata et al.

(10) Patent No.: US 9,239,989 B2
(45) Date of Patent: Jan. 19, 2016

(54) COMPUTER-IMPLEMENTED SYSTEM WITH ADAPTIVE COGNITIVE FEATURES AND METHOD OF USING THE SAME

(75) Inventors: Bouchra Bouqata, Troy, NY (US); Daniel John Messier, New Scotland, NY (US); John William Carbone, Ballston Spa, NY (US); Joseph James Salvo, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 462 days.

(21) Appl. No.: 13/432,883

(22) Filed: Mar. 28, 2012

(65) Prior Publication Data

US 2013/0262349 A1    Oct. 3, 2013

(51) Int. Cl.
G06F 15/18    (2006.01)
G06N 99/00    (2010.01)

(52) U.S. Cl.
CPC .................. *G06N 99/005* (2013.01)

(58) Field of Classification Search
CPC ...... G06F 15/18; G06N 99/005; G06N 5/027; G06N 5/025
USPC ........................................................ 706/12
See application file for complete search history.

(56) References Cited

U.S. PATENT DOCUMENTS

| | | |
|---|---|---|
| 5,113,507 A | 5/1992 | Jaeckel |
| 5,829,009 A | 10/1998 | Frazier |
| 7,080,056 B1 | 7/2006 | Kramer |
| 7,212,976 B2 | 5/2007 | Scheer |
| 7,225,981 B2 | 6/2007 | Jongebloed |
| 7,313,534 B2 | 12/2007 | Scheer |
| 7,324,966 B2 | 1/2008 | Scheer |
| 7,409,356 B1 | 8/2008 | Geddes et al. |
| 7,667,604 B2 | 2/2010 | Ebert et al. |
| 7,689,651 B2 | 3/2010 | Ye et al. |
| 7,969,306 B2 | 6/2011 | Ebert et al. |
| 2002/0143598 A1 | 10/2002 | Scheer |
| 2002/0143669 A1 | 10/2002 | Scheer |
| 2003/0014270 A1 | 1/2003 | Qureshi et al. |
| 2010/0138264 A1 | 6/2010 | Faris et al. |
| 2010/0205044 A1* | 8/2010 | Scheer ............................ 705/10 |

OTHER PUBLICATIONS

Taylor, James H., and A. R. Sayda. "An intelligent architecture for integrated control and asset management for industrial processes." Intelligent Control, 2005. Proceedings of the 2005 IEEE International Symposium on, Mediterrean Conference on Control and Automation. IEEE, 2005.*

(Continued)

*Primary Examiner* — Ben Rifkin
*Assistant Examiner* — Kevin W Figueroa
(74) *Attorney, Agent, or Firm* — John P. Darling

(57) ABSTRACT

A computer-implemented system includes an edge module and at least one input device coupled to the edge module. The at least one input device is configured to generate data input signals. The system also includes a cognitive module coupled to the edge module. The cognitive module includes a perception sub-module coupled to the edge module. The perception sub-module is configured to receive the data input signals. The cognitive module also includes a learning sub-module coupled to the perception sub-module. The learning sub-module is configured to adaptively learn at least in part utilizing the data input signals.

12 Claims, 20 Drawing Sheets

(56) References Cited

OTHER PUBLICATIONS

Shen, Weiming, and Douglas H. Norrie. "An Agent-Based Approach for Manufacturing Enterprise Integration and Supply Chain Management." PROLAMAT. vol. 98. 1998.*

Kazemi, A., and MH Fazel Zarandi. "An agent-based framework for building decision support system in supply chain management." Journal of Applied Sciences 8.7 (2008): 1125-1137.*

Franklin, Stan, et al., IDA: A Cognitive Agent Architecture, Institute for Intelligent Systems, 6 pages, The University of Memphis, Memphis TN.

Morbini, Fabrizio and Lenhart K. Schubert, Conscious Agents, Sep. 2005, pp. 1-74, Department of Computer Science, University of Rochester, Rochester, NY.

Laird, John E., Extending the Soar Cognitive Architecture, 12 pages, Division of Computer Science and Engineering, University of Michigan.

Langley, Pat, et al., Cognitive Architectures: Research Issues and Challenges, Cognitive Systems Research, vol. 10, Issue: 2, 2008, pp. 141-160.

Newell, Allen and Simon Herbert A., The Logic Theory Machine, A Complex Information Processing System, Jul. 1956, pp. 1-63, The Rand Corporation, Santa Monica, California.

Newell, A. and Shaw, J.C., Programming the Logic Theory Machine, Feb. 1957, p. 230-240, Proceedings of the Western Joint Computer Conference, Los Angeles, California.

Newell, A., et al, Empirical Explorations of the Logic Theory Machine: A Case Study in Heuristic, Feb. 1957, p. 218-230, Proceedings of the Western Joint Computer Conference, Los Angeles, California.

McCarthy, John, Programs with Common Sense, 1959, p. 1-15, Computer Science Department, Stanford University, Stanford, California. Primer on Artificial Intelligence (State-of-the-art bibliography) Atariarchives.org, Software & Info, 1977, The Best of Creative Computing vol. 2, 4 pages, http://www.atariarchives.org/bcc2showpage.php?page=50.

Bajcsy, Ruzena and Kosecka, Jana, The Problem of Signal and Symbol Integration: A Study of Cooperative Mobile Autonomous Agent Behaviors, 1995, 18 pages, Department of Computer & Information Science, Technical Reports (CIS), University of Pennsylvania.

Minsky, Marvin, Steps Toward Artificial Intelligence, 1960, 42 pages, Department of Mathematics, MIT, Research Lab of Electronics, MIT.

Maes, Pattie, Learning Behavior Networks from Experience, 1992, pp. 48-57, MIT Media-Lab, Cambridge, MA.

Selfridge, O. G., Mechanisation of Thought Process, 1958, 22 pages, Proceedings of a Symposium Held at the National Physical Laboratory, London, England.

Kanerva, Pentti, Sparse Distributed Memory and Related Models, 1992, 58 pages, RIACS Technical Report 92.10, NASA Ames Research Center.

Minsky, Marvin, K-Lines: A Theory of Memory, 1980, pp. 117-133, Cognitive Science 4, Massachusetts Institute of Technology.

Baars, Bernard J., Understanding Subjectivity: global Workspace theory and the Resurrection of the Observing Self, 1996, 7 pages, Journal of Consciousness Studies, 3, No. 3, The Wright Institute.

Hawkins, Jeff, Hierarchical temporal Memory (HTM), A New Computational Pradigm Based on Cortical Theory, 2006, 49 pages, Numenta, IBM.

Zadeh, Lotfi A., Toward a Theory of Fuzzy Information Granulation and its Centrality in Human Reasoning and Fuzzy Logic, 1997, pp. 111-127, Fuzzy Set and Systems, Elsevier Science.

Schroder, Marc and Cowie, Roddy, Developing a Consistent View on Emotion-Oriented Computing, 12 pages, http://emotion-research.net.

Brooks, Rodney A., A Robust Layered Control System for a Mobile Robot, 1985, 26 pages, A. I. Memo 864, Massachusetts Institute of Technology Artificial Intelligence Laboratory.

Franklin, Stan, Artificial Minds, 1995, 88 pages, A Bradford Book, The MIT Press, Cambridge, Massachusetts.

Haikonen, Pentti O., The Cognitive Approach to Conscious Machines, 2003, 48 pages, Imprint Academic, UK and USA.

* cited by examiner

COMPUTER-IMPLEMENTED SYSTEM WITH ADAPTIVE COGNITIVE FEATURES AND METHOD OF USING THE SAME

BACKGROUND OF THE INVENTION

The field of the invention relates generally to computer-implemented programs and, more particularly, to a computer-implemented system with adaptive cognitive learning features.

Most known supply chains include a system of organizations, people, and technology that initiate and manage activities, manage the flow of information and resources that manufacture, assemble, and distribute products and materials. Such organizations and people include suppliers, manufacturers, distributors, wholesalers, retailers, and consumers. The supply chains also facilitate relationships between the organizations and people.

At least some known computer-implemented supply chain management systems include sufficient programming to execute supply chain operation based on static data. For example, such systems can determine a least cost method of transporting a product between two points based upon statically-established fuel costs, labor costs, and shipping periods. However, such systems have limited resources for processing the large amounts of data, both static and dynamic data, as well as time sensitive data, typically associated with large-scale, international supply chain networks. Such data includes aging weather forecasts and traffic conditions. Also, such systems lack mechanisms to distinguish between valid data and invalid data.

Many such known systems require routine human intervention to input emergent data and to correct for unforeseen events. For example, human dispatchers facilitate enhancing the efficiency of a fleet by taking into account static variables such as delivery windows, contracted levels of service, and estimated times of arrival (ETA). In addition to these static variables, dispatchers also respond to dynamic conditions, for example, seasonal traffic conditions, unanticipated disruptive weather, and real-time driver behavior. For emergent adverse conditions, the dispatchers react to reduce the impact of those adverse conditions on operation after some period of latency associated with data collection, report delivery, and human deliberation. Furthermore, such systems require humans to perform pre-delivery planning and post-delivery analysis, wherein the post-delivery analysis is used as a feedback mechanism for subsequent pre-delivery planning. Moreover, since such systems lack adaptive cognitive features, including adaptive learning features, subsequent corrections for real-world, real-time, unanticipated events need to be directed by a human agent.

BRIEF SUMMARY OF THE INVENTION

In one aspect, a computer-implemented system is provided. The system includes an edge module and at least one input device coupled to the edge module. The at least one input device is configured to generate data input signals. The system also includes a cognitive module coupled to the edge module. The cognitive module includes a perception sub-module coupled to the edge module. The perception sub-module is configured to receive the data input signals. The cognitive module also includes a learning sub-module coupled to the perception sub-module. The learning sub-module is configured to adaptively learn at least in part utilizing the data input signals.

In a further aspect, a method of using a computer-implemented system having adaptable cognitive features is provided. The method includes executing instructions stored on a computer-readable medium. The instructions include generating a plurality of potential solutions in accordance with at least one predetermined goal of the computer-implemented system to ameliorate a dynamically determined condition based on at least one of real-time data inputs transmitted from at least one data input entity and at least one model formed and stored within the computer-implemented system. The instructions also include generating at least one scenario for each of the plurality of solutions defining at least one string of forecasted real world events resulting from implementation of each of the plurality of solutions. The forecasted real world events are at least one of possible and probable. The instructions further include comparing the strings of possible and probable forecasted real world events resulting from the implementation of each of the plurality of potential solutions to each other. The instructions also include selecting at least one course of action from the plurality of potential solutions based at least in part on the comparison. The instructions further include transmitting at least one directive associated with the at least one course of action to at least one operative entity, thereby executing the at least one course of action.

In another aspect, a method of using a computer-implemented system with adaptable cognitive features is provided. The method includes executing instructions stored on a computer-readable medium. The instructions include determining a pattern of performance of the computer-implemented system by analyzing at least one of historical data and previously generated courses of action. The instructions also include transmitting the pattern of performance to an adaptive cognitive module of the computer-implemented system. The instructions further include modifying a model using the adaptive cognitive module.

BRIEF DESCRIPTION OF THE DRAWINGS

These and other features, aspects, and advantages will become better understood when the following detailed description is read with reference to the accompanying drawings in which like characters represent like parts throughout the drawings, wherein.

Figure 1:
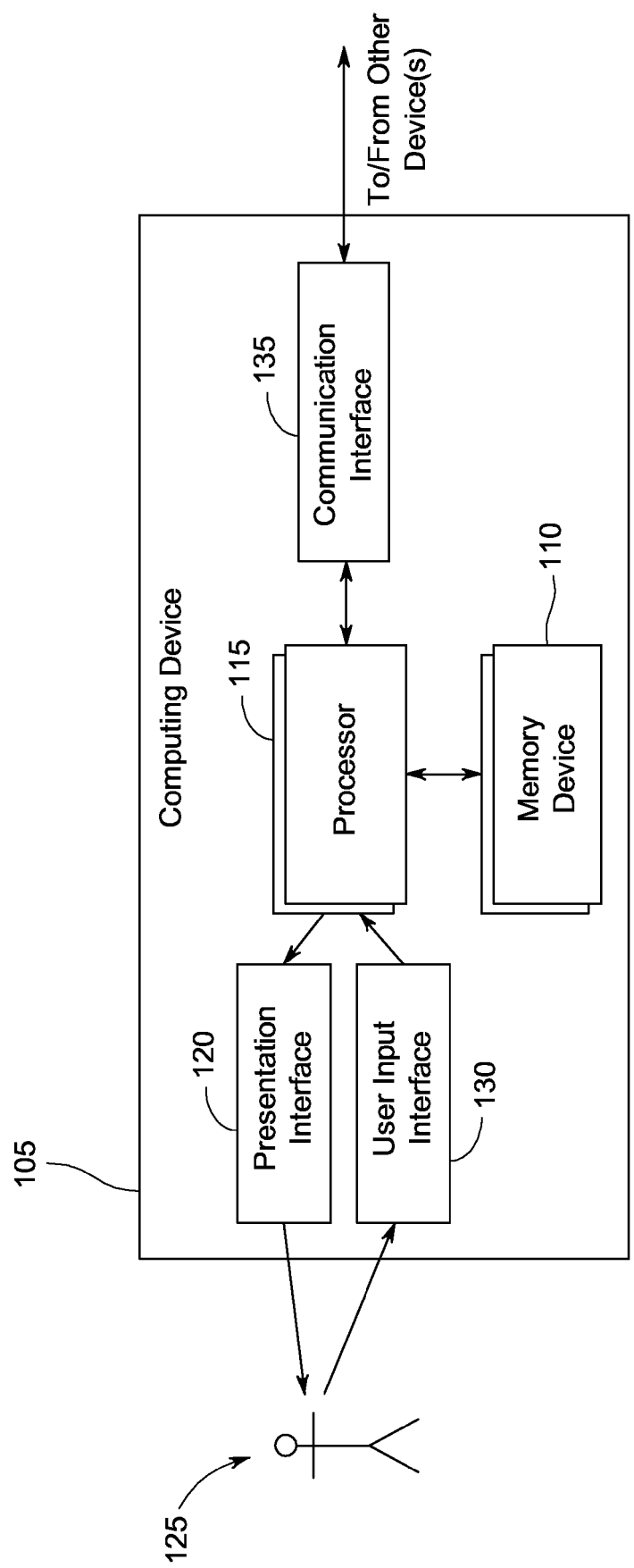
FIG. 1 is a block diagram of an exemplary computing device that may be used to provide residence to at least a portion of an intelligent, neuromorphic, and adaptive cognitive system.

Unless otherwise indicated, the drawings provided herein are meant to illustrate key inventive features of the invention. These key inventive features are believed to be applicable in a wide variety of systems comprising one or more embodiments of the invention. As such, the drawings are not meant to include all conventional features known by those of ordinary skill in the art to be required for the practice of the invention.

DETAILED DESCRIPTION OF THE INVENTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

As used herein, the terms "intelligence" and "intelligent" are intended to be descriptive of any computer-implemented programs and computer-based systems that are implemented such that they demonstrably exhibit abilities, including, without limitation, attention, abstract thought, understanding, communication, reasoning, learning, planning, emotional intelligence and/or problem solving.

As used herein, the terms "neuromorphic programs" and "neuromorphic systems" are intended to be representative of any computer-implemented programs and computer-based systems that are implemented such that they emulate neuro-biological architectures present in the nervous system. Also, as used herein, the terms "neuromorphic programs" and "neuromorphic systems" are intended to be representative of any combination of analog, digital, mixed-mode analog/digital, and software systems that implement models of neural systems that emulate, without limitation, human perception, human motor control, and human sensory processing. Further, as used herein, such neuromorphic programs and systems are flexible and may morph and/or adapt to emergent conditions as necessary.

As used herein, the terms "cognitive" and "cognition" are intended to be descriptive of any computer-implemented programs and computer-based systems that execute processes that include, without limitation, continuous learning, adaptation, planning, remembering, forgetting, language, memory structure, perception, communicating, deliberating, applying knowledge, solving problems, making decisions, changing preferences, sensory input, internal thinking, and reflex actions. Cognition, or cognitive processes, can be artificial including states of intelligent entities, such as, highly autonomous machines and artificial intelligences that have the ability to process, e.g., take into consideration, feedback from the environment.

As used herein, the term "asset management system" is intended to be representative of any computer-implemented programs and computer-based systems that facilitate, without limitation, design, planning, execution, control, and monitoring of assets. Such asset management systems include, without limitation, "supply chain management (SCM) systems." As used herein, SCM systems facilitate executing activities that include, without limitation, tracking movement and storage of raw materials, tracking work-in-process inventory, and tracking finished goods from a point of origin to a point of consumption, and synchronizing supply with demand.

As used herein, the terms "intelligent system", "artificial intelligence", "intelligent agent", and "artificial consciousness" are intended to be representative of, without limitation, any computer-implemented programs and computer-based systems that perceive their environments, independently determine courses of action, and take the actions that will maximize the chances of success.

As used herein, the terms "artificial neural network (ANN)" and "neural network (NN)" are intended to be representative of any computer-implemented programs and computer-based systems that model complex relationships between inputs and outputs or to find patterns in data. Also, as used herein, ANNs and NNs are adaptive systems that change their structure based on external or internal information that flows through the network during a learning phase.

As used herein, the term "support vector machine (SVM)" is intended to be representative of any computer-implemented and computer-based classification methods that construct hyperplanes in multidimensional space to analyze data, recognize patterns, classify and sort such data with similar attributes into one set of defined groups, categorize and sort such data with similar and/or differing attributes into other sets of defined groups, and develop the ability to predict such classification and/or categorization after "training" with training data.

As used herein, the term "SVM clustering" is intended to be representative of any computer-implemented and computer-based methods that use an SVM-based clustering algorithm to classify and categorize data according to the attributes of the data. Such attributes may be predefined, including each attribute having a predefined relevance, and the clustering algorithm will cluster according to the predefined attributes and their degree of relevance. Such SVM clustering algorithms are typically referred to as "supervised" SVM algorithms and require external support for their training. Alternatively, such attributes may be undefined and the clustering algorithm will self-determine such attributes, sort accordingly, and review the sorted data for attribute consistency, thereby performing self-training. Such SVM clustering algorithms are typically referred to as "non-parametric" SVM algorithms and require little to no external support for their training.

As used herein, the term "sparse distributed memory (SDM)" is intended to be representative of any computer-implemented and computer-based random-access, content addressable memory that mathematically model human long-term memory for storing and retrieving large amounts (i.e., in excess of $2^{1000}$ bits) of information without focusing on the accuracy of the information. Such sparse distributed memory uses patterns to serve as memory addresses, where information is retrieved based on similarities between addresses. Memory addresses are all in a list even if they are not related, but are only retrieved based on similar content between them. Also, as used herein, SDM can be used as a perceptual memory system that allows for retrieving best-match memories, associative memories, sequences, and predicting future inputs.

As used herein, the term "genetic algorithm (GA)" is intended to be representative of any portion of computer-implemented programs and computer-based systems that includes a search heuristic that emulates the process of natural evolution to generate useful solutions to optimization and search problems.

As used herein, the term "heuristic" is intended to be representative of any portion of computer-implemented programs and computer-based systems that uses experience-based techniques for problem solving, learning, and discovery.

As used herein, the term "Java® Native Interface (JNI, or Jini)" is intended to be representative of any computer-implemented programs and computer-based systems that are a programming framework that enables Java® code running in a Java® Virtual Machine (JVM) to call, and to be called by, native applications, i.e., programs specific to a hardware and operating system platform, and libraries written in other languages, e.g., C, C++, and assembly. Java® is a registered trademark of Oracle Corporation headquartered in Redwood Shores, Calif., USA.

As used herein, the term "thread" is intended to be representative of the smallest unit of any computer-implemented and computer-based processing that can be scheduled by an operating system.

As used herein, the term "model-view-controller (MVC)" is intended to be representative of any computer-implemented and computer-based software architectural pattern that isolates "domain logic", i.e., the application logic for the user, from the user interface (UI), i.e., input and presentation, thereby facilitating independent development, testing and maintenance of each, while facilitating a loose coupling between these elements.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein.

Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

As used herein, the term "dynamic contextual data" is intended to be representative of any data that includes contextual associations and interrelationships with respect to any other data in a dynamic environment. Similarly, as used herein, "static contextual data" is intended to be representative of any data that includes contextual associations and interrelationships with respect to any other data in a static environment.

As used herein, the terms "software" and "firmware" are interchangeable, and include any computer program stored in memory for execution by devices that include, without limitation, mobile devices, clusters, personal computers, workstations, clients, and servers.

As used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

As used herein, the term "computer" and related terms, e.g., "computing device", are not limited to integrated circuits referred to in the art as a computer, but broadly refers to a microcontroller, a microcomputer, a programmable logic controller (PLC), an application specific integrated circuit, and other programmable circuits, and these terms are used interchangeably herein.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

FIG. 1 is a block diagram of an exemplary computing device 105 that may be used to provide residence to at least a portion of an intelligent, neuromorphic, cognitive, computer-implemented asset management system with adaptive cognitive features, i.e., an intelligent, neuromorphic, cognitive asset management, or supply chain management (SCM) system (not shown in FIG. 1).

Computing device 105 includes a memory device 110 and a processor 115 operatively coupled to memory device 110 for executing instructions. Processor 115 may include one or more processing units (e.g., in a multi-core configuration). In some embodiments, executable instructions are stored in memory device 110. Computing device 105 is configurable to perform one or more operations described herein by programming processor 115. For example, processor 115 may be programmed by encoding an operation as one or more executable instructions and providing the executable instructions in memory device 110.

In the exemplary embodiment, memory device 110 is one or more devices that enable storage and retrieval of information such as executable instructions and/or other data. Memory device 110 may include one or more tangible, non-transitory computer-readable media, such as, without limitation, random access memory (RAM), dynamic random access memory (DRAM), static random access memory (SRAM), a solid state disk, a hard disk, read-only memory (ROM), erasable programmable ROM (EPROM), electrically erasable programmable ROM (EEPROM), and/or non-volatile RAM (NVRAM) memory. The above memory types are exemplary only, and are thus not limiting as to the types of memory usable for storage of a computer program.

Also, in the exemplary embodiment, memory device 110 includes a sparse distributed memory (SDM) configuration, wherein such SDM configuration is defined using software. Alternatively, such SDM configuration is defined using any combination of SDM-capable hardware and SDM-compatible software that enables operation of the adaptive cognitive system as described herein.

Memory device 110 may be configured to store operational measurements including, without limitation, shipping points, destination points, real-time weather and traffic conditions therebetween, and/or any other type of data. In some embodiments, processor 115 removes or "purges" data from memory device 110 based on the age of the data. For example, processor 115 may overwrite previously recorded and stored data associated with a subsequent time and/or event. In addition, or alternatively, processor 115 may remove data that exceeds a predetermined time interval. Also, memory device 110 includes, without limitation, sufficient data, algorithms, and commands to facilitate operation of the intelligent, neuromorphic, cognitive system with adaptive cognitive features (discussed further below).

In some embodiments, computing device 105 includes a presentation interface 120 coupled to processor 115. Presentation interface 120 presents information, such as a user interface and/or an alarm, to a user 125. In one embodiment, presentation interface 120 includes a display adapter (not shown) that is coupled to a display device (not shown), such as a cathode ray tube (CRT), a liquid crystal display (LCD), an organic LED (OLED) display, and/or an "electronic ink" display. In some embodiments, presentation interface 120 includes one or more display devices. In addition, or alternatively, presentation interface 120 includes an audio output device (not shown) (e.g., an audio adapter and/or a speaker) and/or a printer (not shown). In some embodiments, presentation interface 120 presents an alarm associated with a synchronous machine (not shown in FIG. 1), such as by using a human machine interface (HMI) (not shown).

In some embodiments, computing device 105 includes a user input interface 130. In the exemplary embodiment, user input interface 130 is coupled to processor 115 and receives input from user 125. User input interface 130 may include, for example, a keyboard, a pointing device, a mouse, a stylus, a touch sensitive panel (e.g., a touch pad or a touch screen), and/or an audio input interface (e.g., including a microphone). A single component, such as a touch screen, may function as both a display device of presentation interface 120 and user input interface 130.

A communication interface 135 is coupled to processor 115 and is configured to be coupled in communication with one or more other devices, such as a sensor or another computing device 105, and to perform input and output operations with respect to such devices. For example, communication interface 135 may include, without limitation, a wired network adapter, a wireless network adapter, a mobile telecommunications adapter, a serial communication adapter, and/or a parallel communication adapter. Communication interface 135 may receive data from and/or transmit data to one or more remote devices. For example, a communication interface 135 of one computing device 105 may transmit an alarm to the communication interface 135 of another computing device 105. Communications interface 135 facilitates machine-to-machine communications, i.e., acts as a machine-to-machine interface.

Presentation interface 120 and/or communication interface 135 are both capable of providing information suitable for use with the methods described herein (e.g., to user 125 or another device). Accordingly, presentation interface 120 and communication interface 135 may be referred to as output devices. Similarly, user input interface 130 and communication interface 135 are capable of receiving information suitable for use with the methods described herein and may be referred to as input devices. Interaction of the intelligent, neuromorphic, cognitive systems described herein with a human are not limited to presentation interface 120 and communication interface 135. Rather, other devices (none shown) may be used to communicate with the intelligent, neuromorphic, cognitive systems, for example, without limitation, portable devices with a man-machine-interface (MMI).

Figure 2:
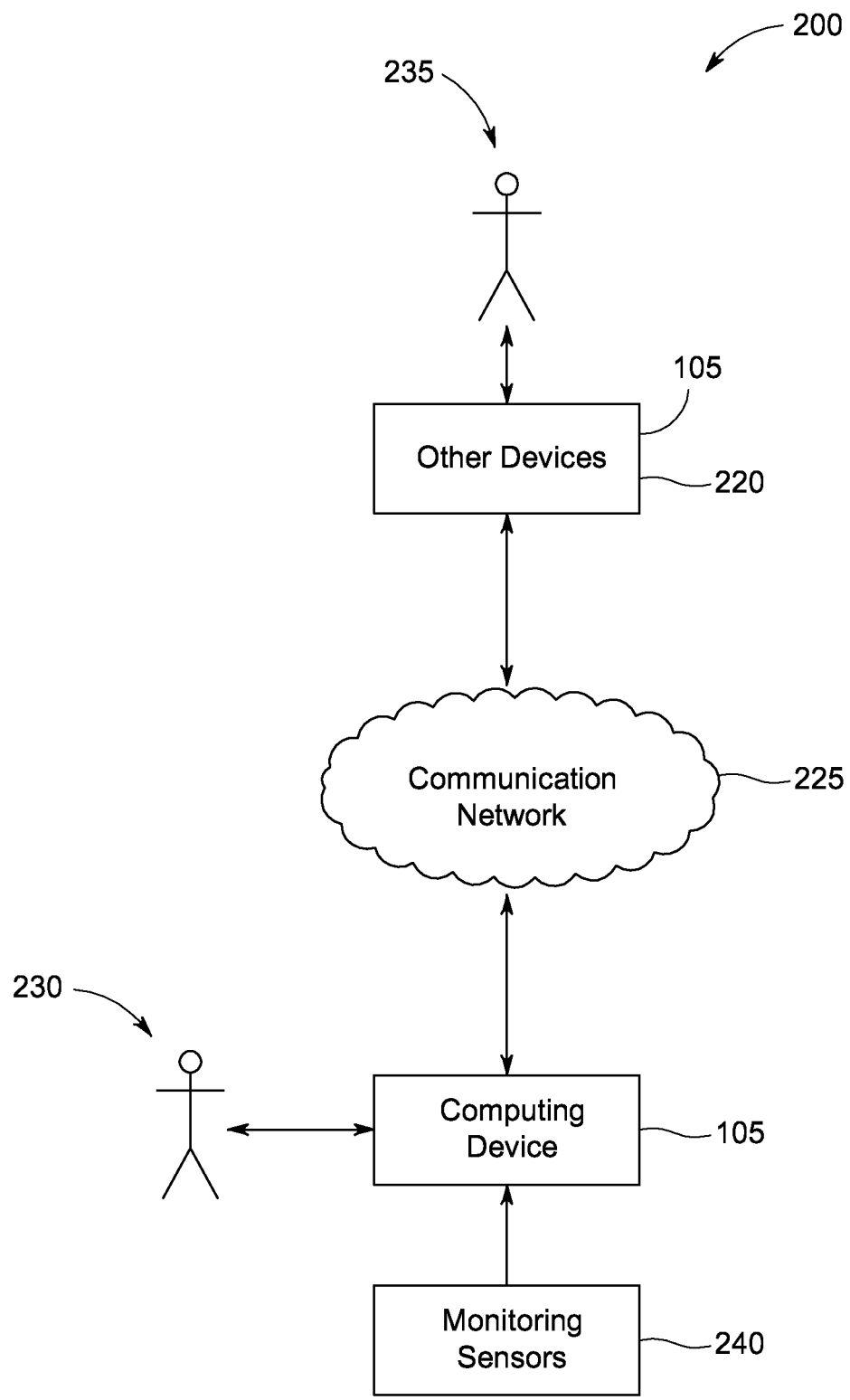
FIG. 2 is block diagram of a portion of an exemplary intelligent, neuromorphic, and adaptive cognitive system.

FIG. 2 is block diagram of a portion of an exemplary intelligent, neuromorphic, cognitive system 200 with adaptive features, i.e., an exemplary adaptive cognitive system 200. System 200 includes at least one computing device 105 that is coupled to other devices 220 via a communication network 225. Embodiments of network 225 may include operative coupling with, without limitation, the Internet, a local area network (LAN), a wide area network (WAN), a wireless LAN (WLAN), and/or a virtual private network (VPN). While certain operations are described below with respect to particular computing devices 105, it is contemplated that any computing device 105 may perform one or more of the described operations.

Referring to FIGS. 1 and 2, in the exemplary embodiment, computing device 105 is coupled to network 225 via communication interface 135. In an alternative embodiment, computing device 105 is integrated with other devices 220. Computing device 105 interacts with a first operator 230 (e.g., via user input interface 130 and/or presentation interface 120). In one embodiment, computing device 105 presents information about system 200, such as alarms, to operator 230. Other devices 220 interact with a second operator 235 (e.g., via user input interface 130 and/or presentation interface 120). For example, other devices 220 present alarms and/or other operational information to second operator 235. As used herein, the term "operator" includes any person or machine in any capacity associated with operating and maintaining system 200, including, without limitation, warehouse operations personnel, system maintenance technicians, system supervisors, and interfacing external systems similar to system 200 and/or automated monitoring systems and operating systems.

In the exemplary embodiment, adaptive cognitive system 200 includes one or more monitoring sensors 240. Monitoring sensors 240 collect operational data including, without limitation, real-time shipment and delivery information, real-time warehouse inventory information, real-time status information from warehouse robots, real-time weather and traffic information, and/or any other type of data. Such data and information may be obtained from devices that include, without limitation, gyroscopes, accelerometers, position detectors, global positioning systems (GPSs), and Internet resources. Monitoring sensors 240 repeatedly (e.g., periodically, continuously, and/or upon request) transmit operational data at the time of measurement and/or receipt. Computing devices 105 within system 200 receive and process the operational data. Also, each computing device 105 includes, without limitation, sufficient data, algorithms, and commands to facilitate centralized and/or distributed monitoring and management of system 200 (discussed further below).

Figure 3:
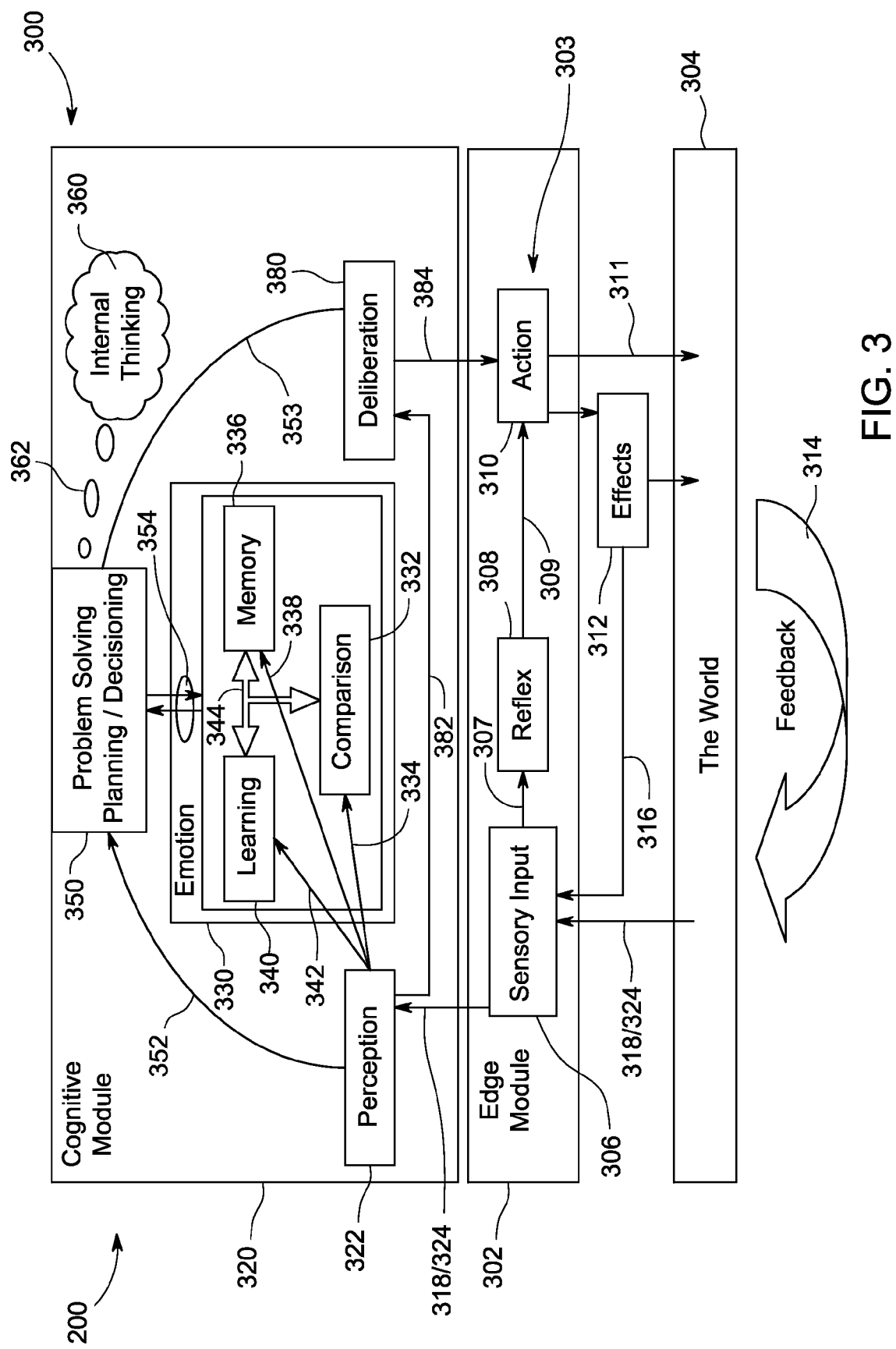
FIG. 3 is a schematic view of an exemplary high-level cognitive architecture that may be used with the adaptive cognitive system shown in FIG. 2.

FIG. 3 is a schematic view of an exemplary high-level cognitive architecture 300 that may be used with adaptive cognitive system 200. System 200 is versatile and scalable and is not limited to any one practical application. Rather, system 200 can be used to facilitate any process that benefits from control and monitoring through an application that continuously learns, adapts, and determines modifications to execution plans as a result of real-time information. System 200 may be used as any stand-alone system including, without limitation, asset management systems, supply chain management systems, and warehouse management systems. Also, system 200 may be implemented within any facility requiring cognitive systems with real-time adaptive features, such facilities including, without limitation, electric power generation facilities, electric power transmission and distribution networks, chemical processing facilities (e.g., refineries), fabrication and assembly facilities, bottling and packaging facilities, patient care networks, and communications networks.

System 200 includes an edge module 302 that includes a plurality of edge devices 303 that facilitate coupling of system 200 to the real world 304. Edge devices 303 include, without limitation, sufficient input and output devices of any type that enable operation of system 200 as described herein.

Edge module 302 includes a sensory input sub-module 306 configured to receive inputs from at least one input entity (not shown in FIG. 3). In the exemplary embodiment, real world 304 includes a plurality of input entities, wherein at least some of the input entities are any devices that interface with real world 304 to measure and/or record conditions in real world 304, such as monitoring sensors 240 (shown in FIG. 2), including, without limitation, devices that measure and transmit temperatures, remaining power storage of mobile warehouse robots, lubrication levels of articulated joints of factory robots, and conveyor belts' alignment. The plurality of input entities also includes other devices 220 (shown in FIG. 2), such as other interfacing systems and agents, including, without limitation, weather forecasting systems, global positioning system (GPS) satellite management systems, facility security systems, enterprise resource planning (ERP) systems, and control systems for communication network 225 (shown in FIG. 2). Moreover, the plurality of input entities includes computing device 105 (shown in FIGS. 1 and 2). Furthermore, the plurality of input entities includes, without limitation, user 125 (shown in FIG. 1) and operators 230 and 235 (both shown in FIG. 2). Also, the plurality of input entities includes sources of information derived internally within system 200, including, without limitation, directions and actions generated by system 200. Sensory input sub-module 306 transmits outputs 307 representative of the inputs received.

In the context of asset management, examples of additional data that may be transmitted from real world 304 include, without limitation, maps of shipping routes, available and unavailable roads, regional traffic and weather conditions, regional crime statistics, regional time of day, and season of the year. Also, in the context of asset management, examples of additional data that may be self-transmitted from resources internal to system 200 include, without limitation, available trailers, trailer conditions, available robots, warehouse inventories (including, wrongly placed inventory), cargo status, vehicle GPS-generated location data, and cargo temperatures. Further, in the context of asset management, examples of additional data that may be input by a human, i.e., user 125, or a human and/or machine, i.e., operators 230 and 235, in the roles of shipping planner and shipping receiver includes, without limitation, matching cargo with destinations, selecting arrival times, cargo conditions, potential events that initiate an alert based on a priority of the shipment, allowable variations in arrival times, and locations to avoid during transit.

At the sensory input level, there is some filtering and preprocessing of the incoming information. For example, the inputs may be monitored consciously by system 200 through a direct information request. More specifically, environmental conditions of a region may be monitored against known and expected conditions for such region and a mismatch may be flagged for further investigation. Also, the inputs may be monitored subconsciously through associated agents looking for specific information and drawing the attention of system 200 to new important changes in the environment, for example, without limitation, those instances where online changes to weather and traffic data are implemented.

Also, in the exemplary embodiment, edge module 302 includes a reflex sub-module 308 coupled to sensory input sub-module 306. Reflex sub-module 308 is configured to generate at least one autonomic response 309 to outputs 307 transmitted from the plurality of input entities, thereby bypassing cognitive portions of system 200 (discussed further below). Reflex sub-module 308 facilitates at least a portion of intelligent and neuromorphic operation of system 200 as described herein. Such autonomic responses 309 may be automatically delegated to reflex sub-module as system 200 learns. As system 200 determines that certain conditions do not need to be transmitted through the cognitive portions of system 200, system resolution and/or management of such certain conditions is "pushed-down" to reflex sub-module 308, thereby reducing the use of dedicated cognitive resources for relatively simple conditions and issues.

In the context of asset management, examples of conditions that can be easily resolved through reflex sub-module 308 include inputs from a shipping planner that are outside established parameters and/or are not logical. Examples of such planner inputs include, without limitation, a blizzard in Arizona and delivery of goods shipped from Los Angeles, USA to Chicago, USA in one hour. Also, in the context of asset management, examples of conditions that can be easily resolved through reflex sub-module 308 include, without limitation, adjusting a warehouse thermostat setting to resolve temperatures outside of established thresholds, and sending alerts for low tire pressures and open doors on vehicles. Further, in the context of asset management, examples of conditions that can be easily resolved through reflex sub-module 308 include, without limitation, directing warehouse robots to avoid obstacles and to send an alert when an item leaves a warehouse without an authorized shipping notice.

Further, in the exemplary embodiment, edge devices 302 include an action sub-module 310 coupled to reflex sub-module 308. Action sub-module 310 is configured to receive autonomic responses 309 transmitted from reflex sub-module 308. Action sub-module 310 is also configured to transmit directives 311 through output devices (not shown in FIG. 3) resident within edge module 302 to operative entities (not shown in FIG. 3) in real world 304. Directives 311 direct execution of a predetermined course of action in real world 304 as a function of autonomic responses 309. As such, action sub-module 310 initiates, facilitates, and directs physical and tangible effects 312 in real world 304 through transmission of directives 311 to the operative entities.

Edge module 302 receives feedback 314 induced by effects 312 as induced by directives 311 as they are transmitted by action sub-module 310 to the operative entities in real world 304. Also, sensory input sub-module 306 receives feedforward information 316 at least partially induced by directives 311 transmitted by action sub-module 310, thereby alerting sensory input sub-module 306 to anticipate certain feedback 314. At least some of the data 324 received by sensory input sub-module 306 includes static and dynamic contextual data 318 and feedback 314, both transmitted from sources in real world 304. Examples of static and dynamic contextual data 318 include, without limitation, statically stored historical weather and traffic data and dynamic real-time weather and traffic data, respectively.

System 200 also includes an adaptive cognitive module 320 that performs a significant portion of intelligent, neuromorphic, and cognitive operation of system 200 as described herein. Cognitive module 320 includes a perception sub-module 322 coupled to sensory input sub-module 306. Perception sub-module 322 is configured to receive static and dynamic contextual data 318 in addition to other predetermined data 324 from sensory input sub-module 306 and the associated input entities. Perception sub-module 322 is also configured to augment incoming data 324, including static and dynamic contextual data 318 depending on the attention, experience, context, and expectations of system 200 as discussed further below. Perception sub-module 322 is further configured to preprocess incoming information by analyzing incoming data 324 and interpreting the information in data 324 to determine the subsequent use of the data 324. In making such determinations, perception sub-module 322 uses conscious goals of system 200, subconscious goals of system 200, and/or external agent-based behavior, as discussed further below. Perception sub-module 322 is further configured to perceive an episodic sense of time through system 200's perception of events and stored memories of such events. Therefore, system 200 demonstrates the ability to estimate long and short time intervals and perceive time emotionally, i.e., perceiving the speed of time as passing slowly when waiting for an event to occur in contrast to time passing more quickly when satisfactory, or pleasing events are occurring.

Adaptive cognitive module 320 also includes an emotion sub-module 330 configured to distinguish between positive outcomes and negative outcomes, i.e., emotion sub-module 330 generates an emotional response to real world effects 312 generated as a result of executing course of action 384. Therefore, system 200 makes determinations of events and data that are good, bad, pleasant, and unpleasant, and modifies course of action 384 accordingly. For example, without limitation, incoming data 324 is compared with expected values and can change perceptions generated by perception sub-module 322 to trigger an emotional response to static and dynamic contextual data 318 and real world effects 312.

Adaptive cognitive module 320 further includes a comparison sub-module 332 that is coupled to perception sub-module 322 and emotion sub-module 330. Comparison sub-module 332 is configured to compare at least a portion 334 of incoming data 324 with predetermined, expected values stored within system 200 and make a determination if the comparison is a positive or a negative result. Therefore, emotion sub-module 330 influences comparison sub-module 332, for example, without limitation, events and data that are perceived by system 200 to be good, bad, pleasant, and unpleasant, will be compared according to such perceptions.

Adaptive cognitive module 320 also includes a memory sub-module 336 that is coupled to perception sub-module 322, emotion sub-module 330, and comparison sub-module 332. Memory sub-module 336 is configured to store at least a portion 338 of incoming data 324 for further use within system 200. Memory sub-module 336 includes a plurality of memory devices 110, and is therefore physically and virtually distributed throughout system 200. Memory sub-module 336 is configured to store a plurality of data and data types therein, including, without limitation, processed data, historical data, user and customer preferences, user and customer alerts and alarms, data models, learned patterns, previously compared data, and algorithms. Emotion sub-module 330 influences memory sub-module 336, for example, without limitation, events and data that are perceived by system 200 to be good, bad, pleasant, and unpleasant, will be stored in memory according to such perceptions.

As described above, memory sub-module 336 is a software-configured SDM that substantially models human memory to facilitate learning, pattern recognition, and self-guided decision capabilities. It can be used as a perceptual memory system that allows for retrieving best-match memories, associative memories, sequences, and predicting future inputs. SDM creates a multi-dimensional address space, and populates that address space with hard locations, i.e., physical places where data can actually be stored. When storing information, a defined sphere of activation distributes the data among several of the hard locations, thereby creating redundancy and creating an archetype memory that can later be retrieved with only partial cues. Information is retrieved through a series of converging recalls that point to an archetypical data storage location. Such archetypical data storage is described further below and facilitates long-term memory storage of data and models, fuzzy retrieval, partial matching, and determining connections between data and models.

Such SDM stores raw data and processed data, including, without limitation, patterns, algorithms, and models. In the context of an asset management implementation, such data includes, without limitation, past weather, geographic regions, user preferences, trailer availability, upper and lower specification limits for temperatures, assets and their locations, roads, maps, time, past decisions, alerts, customer business rules, lists of possible actions, and events (temporally organized). In general, SDM facilitates storage of data models, learned performances, event patterns, previously compared results, and associated algorithms.

As described above, memory sub-module 336 is physically and virtually distributed throughout system 200 while being embedded, and distributed, within cognitive module 320. A first portion (not shown) of memory sub-module 336 is dedicated to short-term, working memory. In the context of an asset management implementation, working memory may be used to hold data such as, without limitation, data associated with cargo shipment trips and loads currently being processed. A second portion (not shown) of memory sub-module 336 is dedicated to procedural and working memory, wherein such working memory facilitates construction of events with a temporal character, i.e., the abilities of system 200 to sense time and to form episodic memories of events in a series of temporally-organized data. In the context of an asset management implementation, such working memory facilitates, without limitation, construction of future trips and reconstruction of previously completed trips.

A third portion (not shown) of memory sub-module 336 includes semantic long-term memory, i.e., memory in which associations among items are stored as part of a dual-store memory model, in contrast to a single-store retrieved context model including only working memory. Alternatively, the third portion of memory sub-module 336 includes "Knowledge-line", typically shortened to K-line memories, i.e., a mental agent associated with a group of other mental agents that are called, or recalled, after a certain problem is solved or a new idea is formulated. In the context of an asset management implementation, such long-term memory facilitates, without limitation, rapid recall of frequently requested trips and routes, seasonal and conditional associations with routes, and user preferences.

Adaptive cognitive module 320 further includes an adaptive on-line learning sub-module 340 that is coupled to perception sub-module 322, emotional sub-module 330, comparison sub-module 332, and memory sub-module 336. Learning sub-module 340 is configured to receive at least a portion 342 of incoming data 324. Learning sub-module 340 includes, without limitation, a plurality of implemented learning algorithms (discussed further below) that facilitates adaptive cognitive system 200 being generally adaptable to a variety of emergent problems that may arise during operation of system 200. From a broad perspective, adaptive on-line learning sub-module 340 facilitates system 200 acquiring a wide range of background knowledge based on interaction with real world 304.

Adaptive on-line learning sub-module 340 is configured to adaptively learn as a function of static and dynamic contextual data 318 received while system 200 is on-line, i.e., operatively coupled to, and interacting with, real world 304 through edge module 302. Learning sub-module 340 is also configured to generate a plurality of data clusters, wherein each of the data clusters is defined as a function of at least one attribute. Learning sub-module 340 is further configured to form at least one model from at least a portion of the data clusters, wherein the models are configured to substantially represent actual processes and physical artifacts in real world 304. As discussed further below, learning sub-module 340 is configured to learn from past experiences through feedback 314 and modify at least one of the models based on feedback 314, as well as historical data, contextual data, and other on-line data thereby defining at least one modified model. In this respect, emotion sub-module 330 influences learning sub-module 340, for example, without limitation, events and data that are perceived by system 200 to be good, bad, pleasant, and unpleasant, will be influence learning by system 200 according to such perceptions.

In the exemplary embodiment, adaptive cognitive module 320 also includes a data highway 344 that couples adaptive on-line learning sub-module 340, comparison sub-module 332, and memory sub-module 336 to each other. Data highway 344 defines a physical and virtual structure that couples distributed resources and devices.

Cognitive module 320 further includes a problem solving sub-module 350 coupled to perception sub-module 322, comparison sub-module 332, memory sub-module 336, and learning sub-module 340. Problem solving sub-module 350 is configured to receive at least a portion 352 of incoming data 324 from perception sub-module 322, including static and dynamic contextual data 318. Problem solving sub-module 350 includes a plurality of implemented planning/decisioning algorithms (discussed further below) that facilitates adaptive cognitive system 200 being generally adaptable to a variety of emergent problems that may arise during operation of system 200.

Problem solving sub-module 350 is configured to generate at least one potential solution 353 in accordance with at least one predetermined goal of adaptive cognitive system 200 to ameliorate a condition based on at least one of static and dynamic contextual data 318 transmitted from perception sub-module 322 and at least one model defined within memory sub-module 336 and learning sub-module 340. Problem solving sub-module 350 is further configured to generate a new solution and modify an existing solution as a function of the modified models. Problem solving sub-module 350 is coupled to comparison sub-module 332, memory sub-module 336, and learning sub-module 340 through two-way communication channels 354.

Adaptive cognitive module 320 also includes an internal thinking sub-module 360 that is coupled to problem solving sub-module 350. In the exemplary embodiment, at least a portion of internal thinking sub-module 360 is embedded within problem solving sub-module 350 and at least a portion of internal thinking sub-module 360 is external to, and coupled to, problem solving sub-module 350. Alternatively, internal thinking sub-module 360 is either fully embedded within, or fully external to, problem solving sub-module 350. Internal thinking sub-module 360 is configured to generate at least one scenario 362 defining at least one string of forecasted real world events resulting from implementation of a course of action selected from potential solutions 353, wherein the forecasted real world events are at least one of possible and probable. Also, data 352 transmitted from perception sub-module 322 facilitates generating at least one scenario 362 by internal thinking sub-module 360. Examples of real world events that may be included within scenario 362 include, without limitation, likely (and unlikely) weather patterns and traffic patterns.

Inherent within adaptive cognitive system 200 are communications features that couple the components of system 200 as described herein. For example, without limitation, real world data is transmitted to internal thinking sub-module 360, wherein real world data includes at least some static and dynamic contextual data 318. Also, such communication features include at least portions of communication interface 135 that facilitate communication between adaptive cognitive system 200 and other systems and devices to share knowledge and data therebetween. The language used for communications within, and external with, system 200 are selected by system 200 based on the current issues/problems being addressed by system 200, such language including, without limitation, machine-to-machine language for knowledge sharing.

Cognitive module 320 also includes a deliberation sub-module 380 coupled to problem solving sub-module 350, action sub-module 310, and perception sub-module 322. In the exemplary embodiment, deliberation sub-module 380 is configured to receive at least a portion 382 of incoming data 324 and compare potential solutions 353 transmitted from problem solving sub-module 350. Deliberation sub-module 380 is also configured to select at least one course of action 384 from potential solutions 353. Deliberation sub-module 380 is further configured to transmit such course of action 384 to action sub-module 310 such that action sub-module 310 generates and transmits directives 311 to operative entities (not shown in FIG. 3) in real world 304 to execute course of action 384 in real world 304. Deliberation sub-module 380 includes decision-making features that facilitate choosing course of action 384 from potential solutions 353, wherein such decision-making features also facilitate selection of decisions in dynamic environments and in static environments using dynamic data and static data. Deliberation sub-module 380 uses information stored in memory sub-module 336, including, without limitation, models, events, preprocessed sensory input, and the current emotional state of system 200.

Courses of action 384 differ from autonomic responses 309 in that autonomic responses 309 are generated subconsciously, i.e., automatically in response to certain outputs 307 transmitted from sensory input sub-module 306, thereby bypassing cognitive module 320. Such autonomic responses 309 are similar to subconscious, impulsive actions performed by humans that require little to no deliberation, e.g., adjusting an angle and distance of reading materials to more easily read the words. In the context of asset management, examples of conditions that can be easily resolved through autonomic responses 309 include, without limitation, adjusting a warehouse thermostat setting to resolve temperatures outside of established thresholds, and directing warehouse robots to avoid obstacles.

In contrast, courses of action 384 are generated as a function of analysis and deliberation of incoming data 324 by system 200 on a conscious level, i.e. cognitive level. Such courses of action 384 are similar to deliberate, i.e., intentional decisions made by humans, e.g., selection of the reading materials. Adaptive cognitive system 200 thereby demonstrates intentionality based on cognitive deliberation. Courses of action 384 may be generated as a response to changes in the state of an edge device representative of a change in real world 304 or a virtual change. In the context of asset management, examples of conditions that can be resolved through deliberation and intentional action include, without limitation, redirecting a shipment based on emergent and adverse traffic conditions in the near vicinity of the shipment. One possible action is no action at all.

Figure 4:
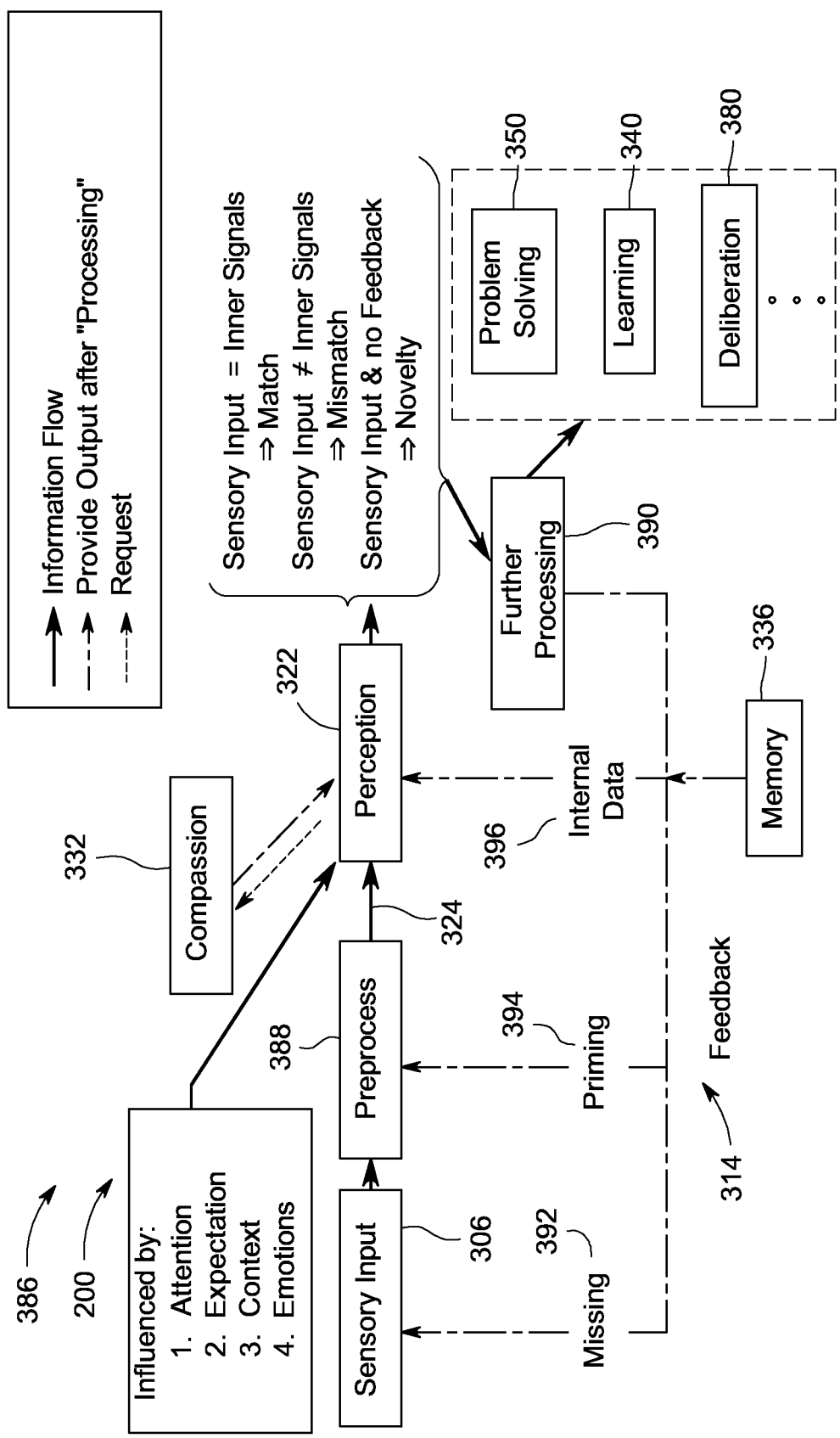
FIG. 4 is a flow chart of an exemplary model of perception data flow that may be used with the adaptive cognitive system shown in FIG. 2.

FIG. 4 is a flow chart of an exemplary model 386 of perception data flow that may be used with adaptive cognitive system 200 (shown in FIG. 2). In the exemplary embodiment, perception sub-module 322 facilitates "making sense" the current situation based on incoming data 324 (shown in FIG. 3) that includes feedback 314.

In general, perception sub-module 322 facilitates interpreting hidden data in the raw sensory information and determines if the input data requires action in terms of problem solving, learning, or deliberation. Such data routing decisions in perception sub-module 322 are directed by conscious goals of system 200, subconscious goals of system 200, or agent-based behavior of system 200. Operation of perception sub-module 322 is directly influenced by attention, expectations, context, and emotions. When conducting a task, system 200 may be focused on either a single item/issue or a plurality of items/issues. The degree of attention directed towards the incoming data and the associated conditions and situations directly affects the amount of cognitive resources that will be directed to such conditions and situations. Also, the degree of attention to any particular problem depends on factors that include, without limitation, the nature and magnitude of the problem and the goals to be achieved.

The expectations of system 200 will determine if the degree of attention should be increased, decreased, or kept as is based on the degree of success of directives 311 as shown through effects 312 (both shown in FIG. 3). The context of the incoming data influences the degree of attention directed toward the incoming data, wherein data indicative of a primary effect will receive more attention than data associated with less critical effects. The emotions of system 200 are used to influence operation of perception sub-module 322, wherein a positive result and a negative result will have different effects on system 200.

Also, in general, with respect to perception sub-module 322 and system 200, perception is more than mere pattern recognition, i.e., perception includes use of sensory information, embedded information in system 200, e.g., the model of real world 304 (shown in FIG. 3) and the self-contained model of system 200.

In the exemplary embodiment, model 386 includes memory sub-module 336 coupled to sensory input sub-module 306 and perception sub-module 322 through at least a portion of feedback 314. Model 386 also includes a preprocess function block 388 positioned between sensory input sub-module 306 and perception sub-module 322. As described above, system 200 performs some filtering and preprocessing of the incoming information, wherein preprocess function block 388 performs the filtering and preprocessing. Model 386 also includes a further processing function block 390 coupled to memory sub-module 336, wherein function block 390 facilitates engaging at least one of problem solving sub-module 350, learning sub-module 340, and deliberation sub-module 380.

Also, in the exemplary embodiment, memory sub-module 336 transmits data stored therein as a function of requests by sensory input sub-module 306, preprocess function block 388, perception sub-module 322, and further processing function block 390. Sensory input sub-module 306 requests and receives data, including, without limitation, missing data 392 that includes, without limitation, data that is missing, but needed, and is resident within memory sub-module 336. Preprocess function block 388 requests and receives data, including, without limitation, priming data 394 that includes, without limitation, data that facilitates filtering and preprocessing of the information received by sensory input sub-module 306.

Further, in the exemplary embodiment, perception sub-module 322 requests and receives data, including, without limitation, internal data 394 that includes, without limitation, data and models that are internal to system 200. Perception sub-module 322, through comparison sub-module 332, compares sensory input data 324 with associated internal data 394 and models and determines if there is a positive match, a positive mismatch, or no associated internal data (indicative of a novel input), and directs a request to further processing function block 390. Function block 390 requests the necessary data from memory sub-module 336 and function block 390 directs the data to at least one of problem solving sub-module 350, learning sub-module 340, and deliberation sub-module 380.

In general, perception sub-module 322 has a perception of time, i.e., system 200 can analyze data as a function of the fourth dimension, i.e., time. Time is perceived because system 200 perceives events, retains memories of those events, and forms an episodic sense of time as a result of the memories. For example, system 200 has the ability to estimate long durations of time and short intervals of time and discern the difference therebetween. Also, system 200 facilitates a perceived speed of time typically associated with humans, e.g., time seems to pass slowly when anxiously waiting for an uncheerful event to happen, and time seems to pass more quickly when cheerful events are occurring.

In the context of an asset management example, for sensory input from a planner interface (not shown, but similar to user input interface 130 shown in FIG. 1), a planner (including, without limitation, user 125 (shown in FIG. 1) and operators 230 and 235 (human or machine) (both shown in FIG. 2)) inputs a selected arrival time of 4:00 p.m. CST on Dec. 21, 2012 for a cargo shipment that is too close to the actual time of the request, i.e., 3:15 p.m. CST on Dec. 21, 2012). To make that temporal proximity determination, system 200 takes into consideration the distance between an origin of the trip, i.e., New York City, USA, and the destination, i.e., Chicago, USA, as well as the anticipated time required for loading the cargo at the warehouse. Perception sub-module 322 generates a request for comparison sub-module 332 to compare the desired time of arrival and the time of request (as input) with the estimated time from loading plus the trip duration from the origin to destination, wherein such data is requested from memory sub-module 336.

An avatar (not shown) will be generated on the planner interface and will request additional information from the planner, thereby showing perceptive features to the planner. The avatar will talk back to the planner and ask if the planner really meant the cargo arrival time at 4:00 p.m. CST on Dec. 21, 2012, and explain to the planner that the delivery to Chicago from New York City will take much longer than 15 minutes. Also, system 200 uses its adaptive learning features to determine trends and patterns associated with the planner, make determinations if the input or requests are inconsistent, and ask the planner if there is an error or if the request is new.

Also, in the context of an asset management example, if the planner inputs that there is a blizzard in Arizona, USA, system 200 will perceive that there is an error and/or inconsistency by comparing the planner's input in comparison sub-module 332 with historical weather patterns for the region resident in memory sub-module 336. An avatar will inform the planner that such weather is not reasonable and request a confirmation or a correction. In the event that the planner is also planning a cargo shipment originating in New York City, and New York City is experiencing a blizzard, system 200 will recognize the origin of the error, and will ask the planner if the blizzard information was for New York City rather than Arizona.

Further, in the context of an asset management example, if a problem with a cargo shipment comes to the attention of system 200, system 200 will perceive the feedback from the receiver and compare it with the feedback from the planner. Also, system 200 will also perceive the trends in response from the receiver and the planner concerning the problem and push the problem resolution to learning sub-portion 340.

Moreover, in the context of an asset management example, robots in a warehouse can perceive changes in the warehouse environment, including, without, limitation, the absence of an expected item in inventory.

Figure 5:
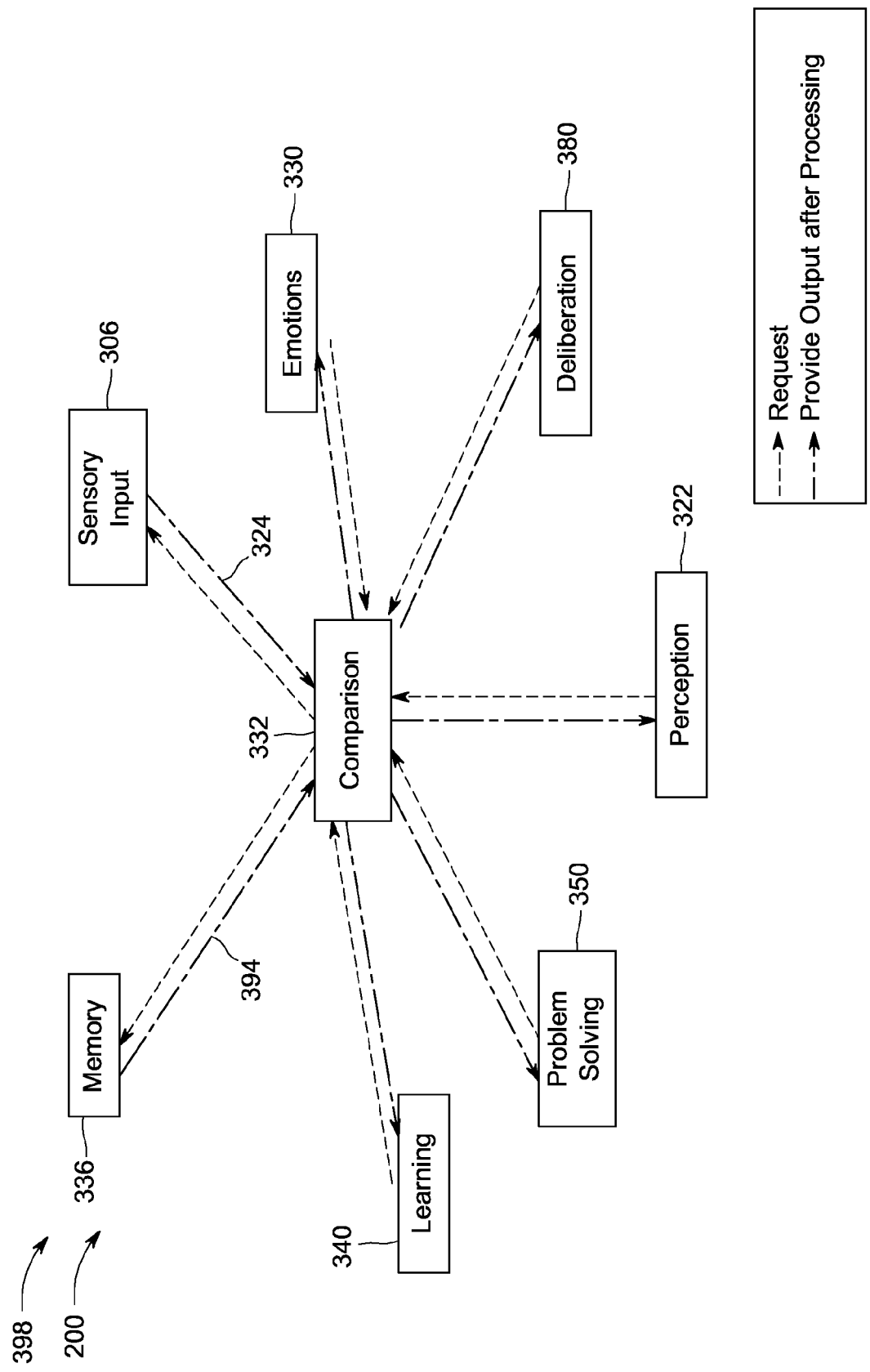
FIG. 5 is a flow chart of an exemplary model of comparison data flow that may be used with the adaptive cognitive system shown in FIG. 2.

FIG. 5 is a flow chart of an exemplary model 398 of comparison data flow that may be used with adaptive cognitive system 200. In the exemplary embodiment, comparison sub-module 332 is directly or indirectly coupled to each of problem solving sub-module 350, perception sub-module 322, deliberation sub-module 380, sensory input sub-module 306, emotion sub-module 330, memory sub-module 336 and learning sub-module 340. Comparison sub-module 332 is requested by those other portions of system 200 to perform data comparisons as needed. Comparison sub-module 332 returns a comparison output to the component that requested the comparison. For example, as described above for perception sub-module 322, comparison sub-module 332 compares sensory input data 324 with associated internal data 394 and determines if there is a positive match, a positive mismatch, or no associated internal data (indicative of a novel input), and directs a request to further processing function block 390 (shown in FIG. 4).

In the context of an asset management example, for sensory input from a planner interface or a receiver interface (neither shown, but both similar to user input interface 130 shown in FIG. 1), a planner (including, without limitation, user 125 (shown in FIG. 1) and operators 230 and 235 (human or machine) (both shown in FIG. 2)), the sensory input is compared with a model of expected input, e.g., without limitation, previous orders and delivery times. An unusual order may trigger a different perception, e.g., an avatar (not shown) may request an order confirmation.

Also, in the context of an asset management example, incoming data 324 (shown in FIG. 3) from sources other than human are treated like any sensory input, i.e., the data can be compared with expected values, e.g., expected weather by season, wherein system 200 can change perceptions or trigger emotions in response to such data 324. Further, in the context of an asset management example, warehouse robots could compare conditions from their sensory input devices (not shown), e.g., without limitation, bump sensors and pointing lasers, and compare with an internally-embedded map of the warehouse environment.

Figure 6A:
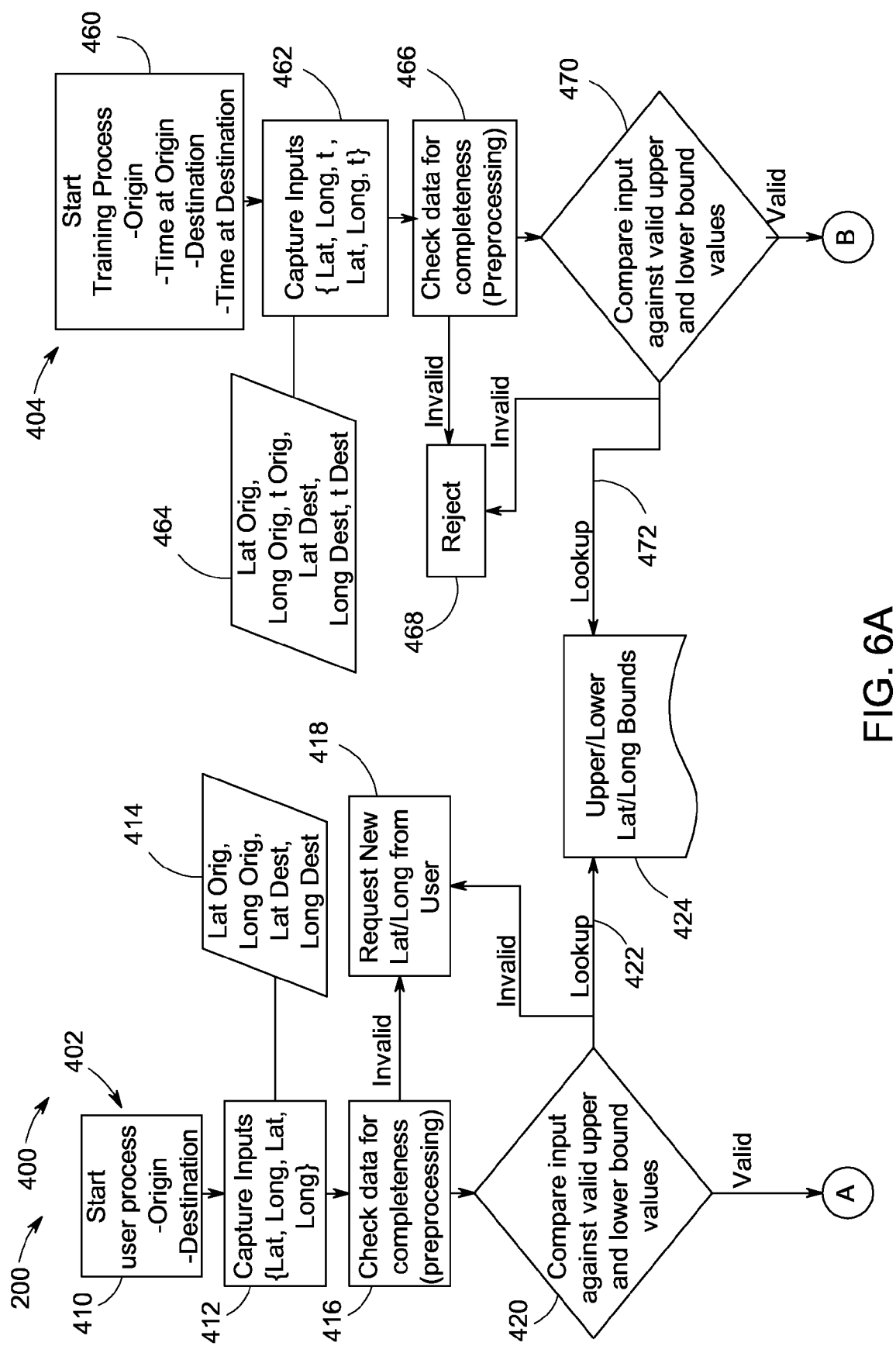
FIG. 6 is a flow chart of an exemplary functional logic architecture that may be used with the adaptive cognitive system shown in FIG. 2.
Figure 6B:
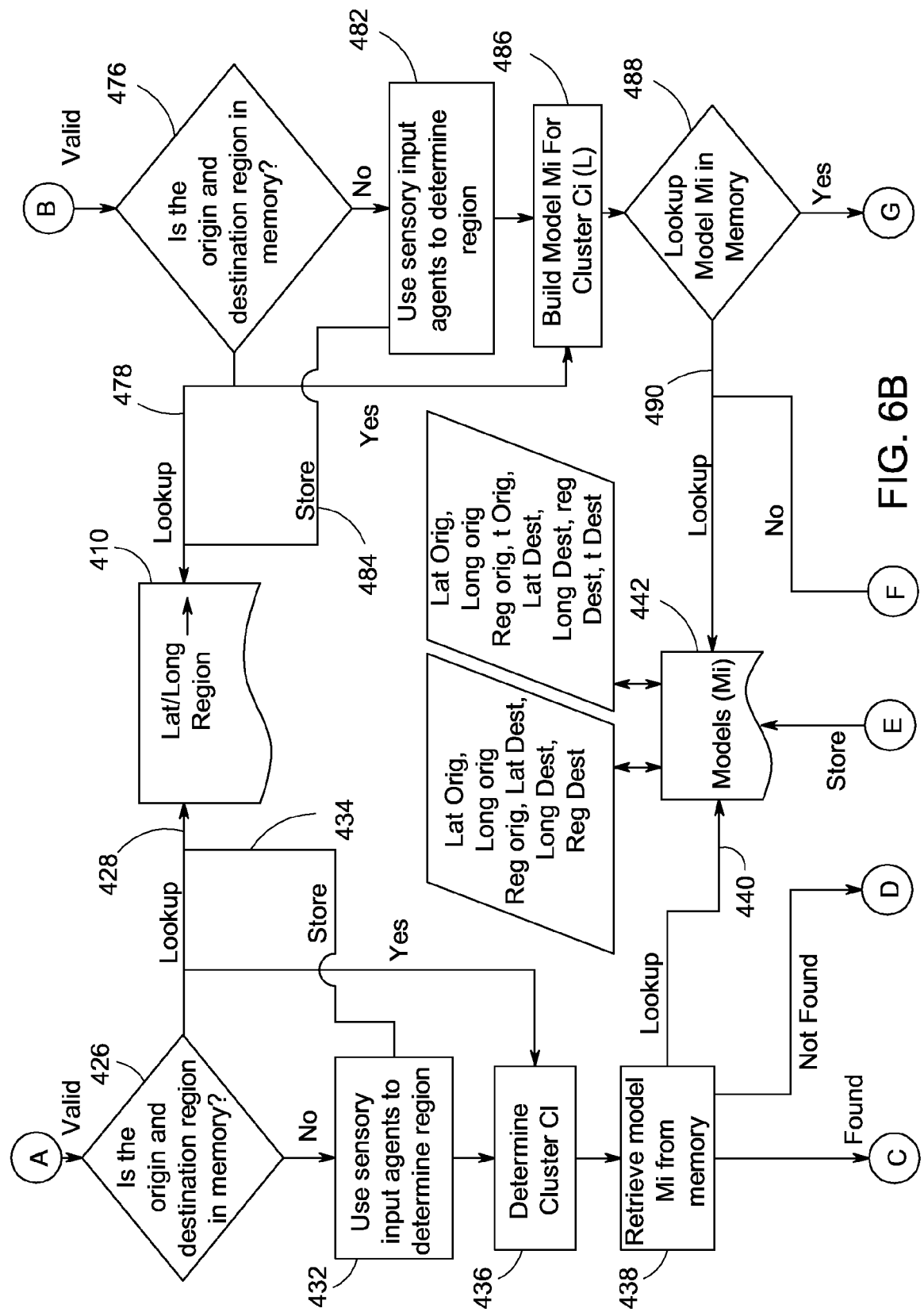
Figure 6C:
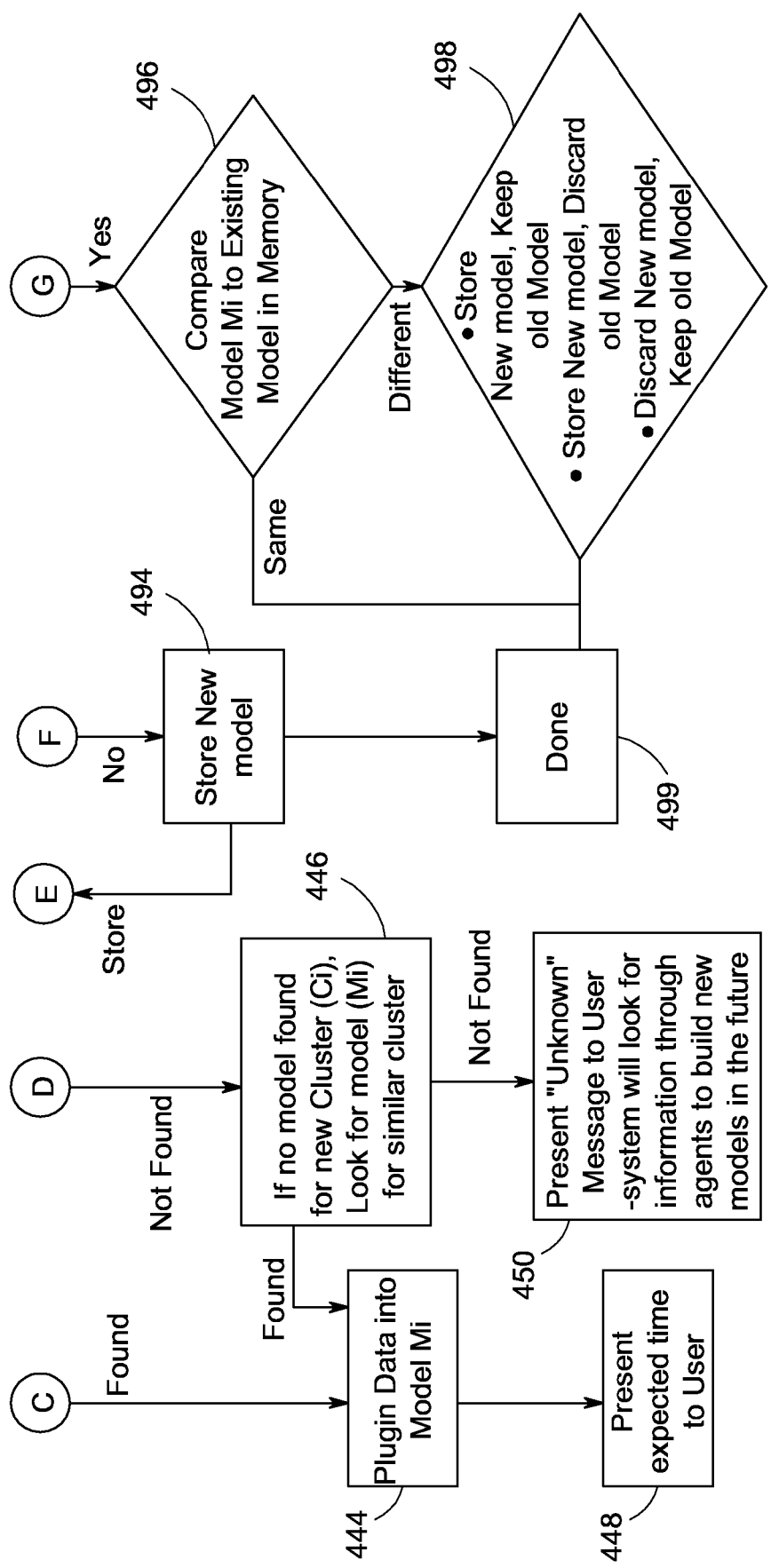
Figure 7:
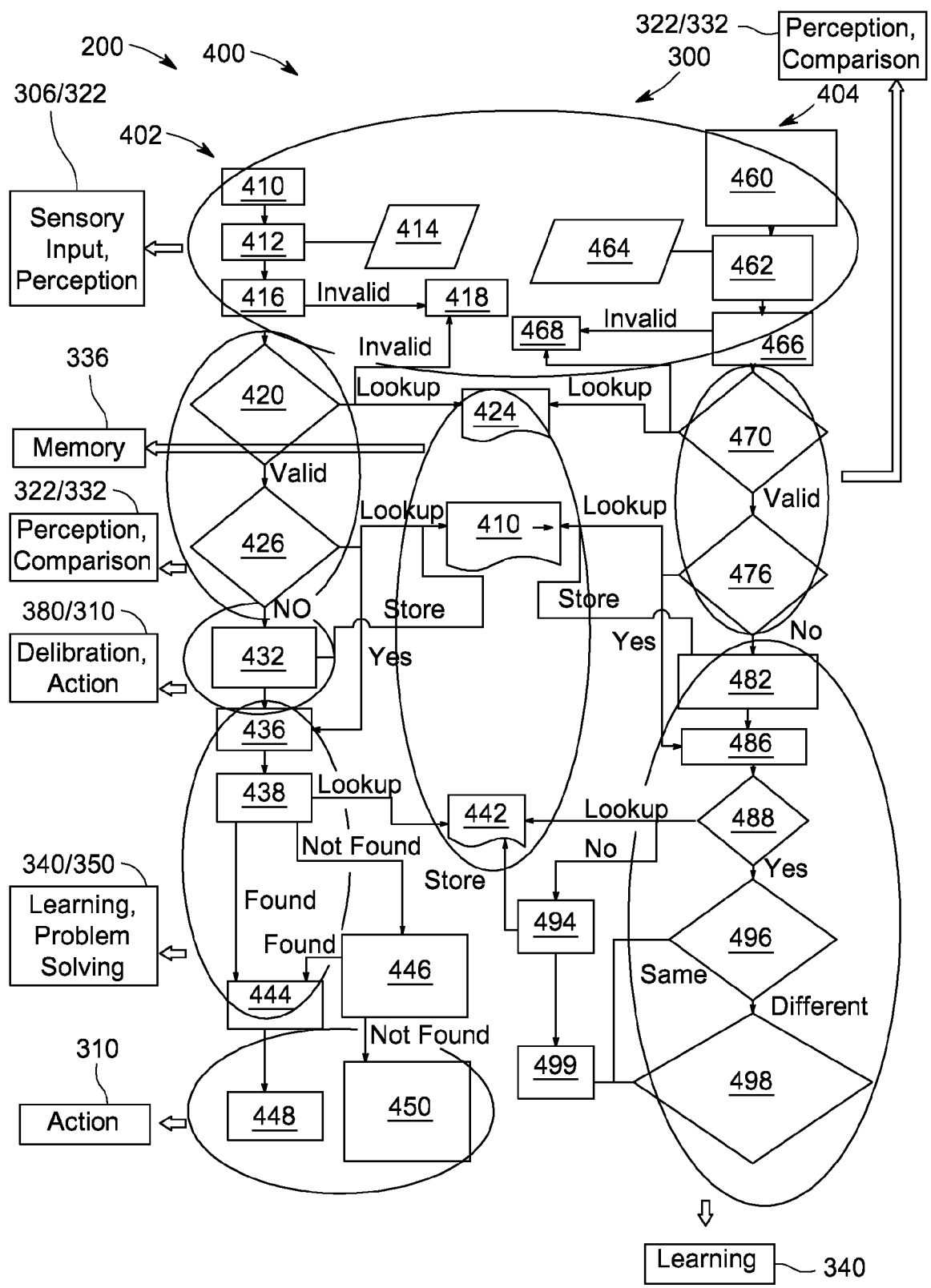
FIG. 7 is a view of the functional logic architecture shown in FIG. 6 in relationship to the high-level cognitive architecture shown in FIG. 3.

FIG. 6 is a flow chart of an exemplary functional logic architecture 400 that may be used with intelligent, neuromorphic, cognitive, system 200. FIG. 7 is a view of functional logic architecture 400 in relationship to high-level cognitive architecture 300. In the exemplary embodiment, a material shipping example is used to illustrate the interaction of portions of high-level cognitive architecture 300 and functional logic architecture 400.

Functional logic architecture 400 includes two sequences, i.e., a production sequence 402 and a learning sequence 404. Production sequence 402 facilitates operation of system 200 to control at least a portion of the environment of real world 304 (shown in FIG. 3) to achieve a goal of system 200. Learning sequence 404 facilitates a training process that generates an inventory of success-oriented models based on historical data including, without limitation, positive outcomes and the negative outcomes.

Production sequence 402 includes a START function block 410 that requires at least some user information, e.g., a shipping origin and a shipping destination. Sequence 402 also includes an input capture function block 412 coupled to a plurality of data registers 414 that include data, e.g., the latitudes and longitudes of the shipping origin and shipping destination. Data registers 414 are input entities as described above, and registers 414 may be resident within an external system, e.g., an Internet-based mapping/GPS application. Sequence 402 further includes a data check function block 416 that verifies that the necessary inputs to initiate the shipping process are available and that the data is complete. Such verification of data completeness represents one aspect of data preprocessing as used by system 200. If the data from registers 414 is determined to be incorrect, a request for user input 418 is transmitted to at least one of user 125 (shown in FIG. 1) and first operator 230 and second operator 235 (human or machine) (both shown in FIG. 2). In the exemplary embodiment, user 125 and operators 230 and 235 are input entities as described above. Function blocks 410, 412, and 416, registers 414, and request for user input 418 are associated with sensory input sub-module 306 and perception sub-module 322.

Production sequence 402 also includes an input comparison function block 420 that compares the validated input values. i.e., verified for completeness, against upper and lower parameters such that the accuracy of the data is verified. A lookup action 422 is performed, i.e., system 200 executes a lookup within memory sub-module 336 by requesting data from registers 424, e.g., upper and lower parameters for the latitude and longitude data provided as described above. If the data is determined to be invalid, request for user input 418 is invoked as described above.

Production sequence 402 further includes a memory verification function block 426 that performs a lookup action 428 in memory sub-module 336 to determine if the parameter-validated data is stored in data register 430 located in memory sub-module 336. For example, system 200 will determine if the data associated with the shipping origin and the shipping destination are in memory sub-module 336. Input comparison function block 420 and memory verification function block 426 are associated with perception sub-module 322 and comparison sub-module 332.

If the data is not in memory sub-module 336, production sequence 402 includes a sensory input agent function block 432 that searches for the correct information. Function block 432 is associated with deliberation sub-module 380 and action sub-module 310. For a specific deficiency, e.g., missing location data, a potential solution 353 (shown in FIG. 3) is generated. One example of a potential solution 353 is "looking on the Internet for the missing data." A similar course of action 384 (shown in FIG. 3) is decided upon, and directions 311 (shown in FIG. 3) are executed in real world 304 to input such data 318 (shown in FIG. 3) into sensory input sub-module 306. Once the data is received by sensory input sub-module 306, the data is transmitted to registers 430 through a store action 434. Alternatively, for such simple activities, such as a data request, the data request may be executed through reflex sub-module 308 to generate an autonomic response 309.

Production sequence 402 also includes a cluster determination function block 436 that generates data clusters $C_i$, wherein i represents any whole number greater than 0, and up to N clusters. Data clusters $C_i$ are defined as a function of at least one attribute, wherein the attributes that define the $C_i$ are one of similarity and dissimilarity. While system 200 endeavors to generalize the attributes, e.g., package dimensions and/or weight, and inclement weather, system 200 generates data clusters $C_i$ that also facilitate granularity, accuracy, and scalability. Methods and mechanisms for clustering are described further below. If the data requested in function block 426 is in data registers 430, cluster determination function block 436 receives the data and generates a data cluster $C_i$ defined by the attributes of that data.

Production sequence 402 further includes a model M, retrieval function block 438 that is configured to execute a lookup action 440 within registers 442 in memory sub-module 336 for any models $M_i$ that are associated with cluster $C_i$. Models $M_i$ are formed within system 200 using at least a portion of a data cluster $C_i$ and are stored in memory sub-module 336. Methods and mechanisms for modeling are described further below. In the exemplary embodiment, there is a one-to-one relationship between a cluster $C_i$ and a model $M_i$. Alternatively, any relationship between clusters $C_i$ and models $M_i$ is used that enables operation of system 200 as described herein, including, without limitation, one-to-many and many-to-many. Since system 200 strives to generalize the attributes of cluster $C_i$ model $M_i$ derived from a generalized-attribute cluster $C_i$ also includes generalized attributes. In the exemplary embodiment, model $M_i$ includes attributes of shipping origin latitude (LatOrig.), longitude (LongOrig.), and regional origin (RegOrig.). Model $M_i$ also includes attributes of destination latitude (LatDest.), longitude (LongDest.), and regional destination (RegDest).

If the associated model $M_i$ is located in memory sub-module 336, the data is plugged into model $M_i$ through a data plug-in function block 444. If an associated model $M_i$ is not found, a model lookup function block 446 searches through memory sub-module 336 for a model $M_i$ that includes data attributes derived from a similar data cluster. If such a model $M_i$ is found, the data is plugged into the similar model $M_i$ through data plug-in function block 444. Cluster determination function block 436, model retrieval function block 438, and data plug-in function block 444 are associated with learning sub-module 340 and problem solving sub-module 350.

Regardless of how found, once a model $M_i$ is located, the data is plugged into model $M_i$ through data plug-in function block 444 and an output function block 448 transmits the information required by one of user 125, first human/machine operator 230, and second human/machine operator 235, e.g., an estimated time of arrival (ETA) of the shipment at the destination. If no models are found, a message function block 450 alerts at least one of user 125, first operator 230, and second operator 235 to the fact that system 200 is not able to provide the information requested and system 200 will collect data to form into new clusters that will subsequently be used to form new models. Output function block 448 and message function block 450 are associated with action sub-module 310.

Learning sequence 404 includes a START function block 460 that utilizes at least some user information to initiate the training process, e.g., a shipping origin and a time of shipping, and a shipping destination and a time of arrival. Sequence 404 also includes an input capture function block 462 coupled to a plurality of data registers 464 that include data, e.g., the latitudes and longitudes of the shipping origin and shipping destination. Data registers 464 are input entities as described above, and registers 464 may be resident within an external system, e.g., an Internet-based mapping/GPS application. Sequence 404 further includes a data check function block 466 that verifies that the necessary inputs to initiate the shipping process are available and that the data is complete. Such verification of data completeness represents one aspect of data preprocessing as used by system 200. If the data from registers 464 is determined to be incorrect, a rejection 468 is transmitted to at least one of user 125 (shown in FIG. 1) and first operator 230 and second operator 235 (human or machine) (both shown in FIG. 2). In the exemplary embodiment, user 125 and operators 230 and 235 are input entities as described above. Also, in the event of rejection 468, learning sequence 404 is terminated. Function blocks 460, 462, and 466, registers 464, and rejection 468 are associated with sensory input sub-module 306 and perception sub-module 322.

Learning sequence 404 also includes an input comparison function block 470 that compares the validated input values, i.e., verified for completeness, against upper and lower parameters such that the accuracy of the data is verified. A lookup action 422 is performed, i.e., system 200 executes a lookup within memory sub-module 336 by requesting data from registers 424, e.g., upper and lower parameters for the latitude and longitude data provided as described above. If the data is determined to be invalid, rejection 468 is invoked as described above.

Learning sequence 404 further includes a memory verification function block 476 that performs a lookup action 478 in memory sub-module 336 to determine if the parameter-validated data is stored in data register 430 located in memory sub-module 336. For example, system 200 will determine if the data associated with the shipping origin and the shipping destination are in memory sub-module 336. Input comparison function block 420 and memory verification function block 426 are associated with perception sub-module 322 and comparison sub-module 332. The remainder of learning sequence 404 is associated with learning sub-module 340.

If the data is not in memory sub-module 336, learning sequence 404 includes a sensory input agent function block 482 that searches for the correct information. For a specific deficiency, e.g., missing location data, a potential solution 353 (shown in FIG. 3) is generated. One example of a potential solution 353 is "looking on the Internet for the missing data." A similar course of action 384 (shown in FIG. 3) is decided upon, and directions 311 (shown in FIG. 3) are executed in real world 304 to input such data 318 (shown in FIG. 3) into sensory input sub-module 306. Once the data is received by sensory input sub-module 306, the data is transmitted to registers 430 through a store action 484. Alternatively, for such simple activities, such as a data request, the data request may be executed through reflex sub-module 308 to generate an autonomic response 309.

Learning sequence 404 also includes a model building function block 486 that is configured to build a model $M_i$ for a cluster $C_i$ of data collected as a result of lookup action 478. Learning sequence 404 further includes a model lookup function block 488 that performs a lookup action 490 in data registers 442 of memory sub-module 336. In the exemplary embodiment, model $M_i$ includes attributes of shipping origin latitude (LatOrig.), longitude (LongOrig.), regional origin (RegOrig.), and time of shipping (tOrig.) Model $M_i$ also includes attributes of destination latitude (LatDest.), longitude (LongDest.), regional destination (RegDest.), and time of delivery (tDest).

If model $M_i$ does not reside within data registers 442, the model $M_i$ is stored therein through a store action 492 and a storage function block 494. If a model similar to model $M_i$ resides within data registers 442, a model comparison function block 496 compares the two models. If the models are sufficiently different, a decision function block 498 executes one of three options. A first option is to store the new model $M_i$ and keep the old model. A second option is to store the new model $M_i$ and discard the old model. A third option is to discard the new model $M_i$ and keep the old model. Regardless of the option selected, or if function block 496 determines the models to be sufficiently similar, a sequence termination function block 499 ends the operation.

In the exemplary embodiment, lookup actions 422, 428, 440, 472, 478, and 490 are performed using the SDM features of memory sub-module 336.

Figure 8:
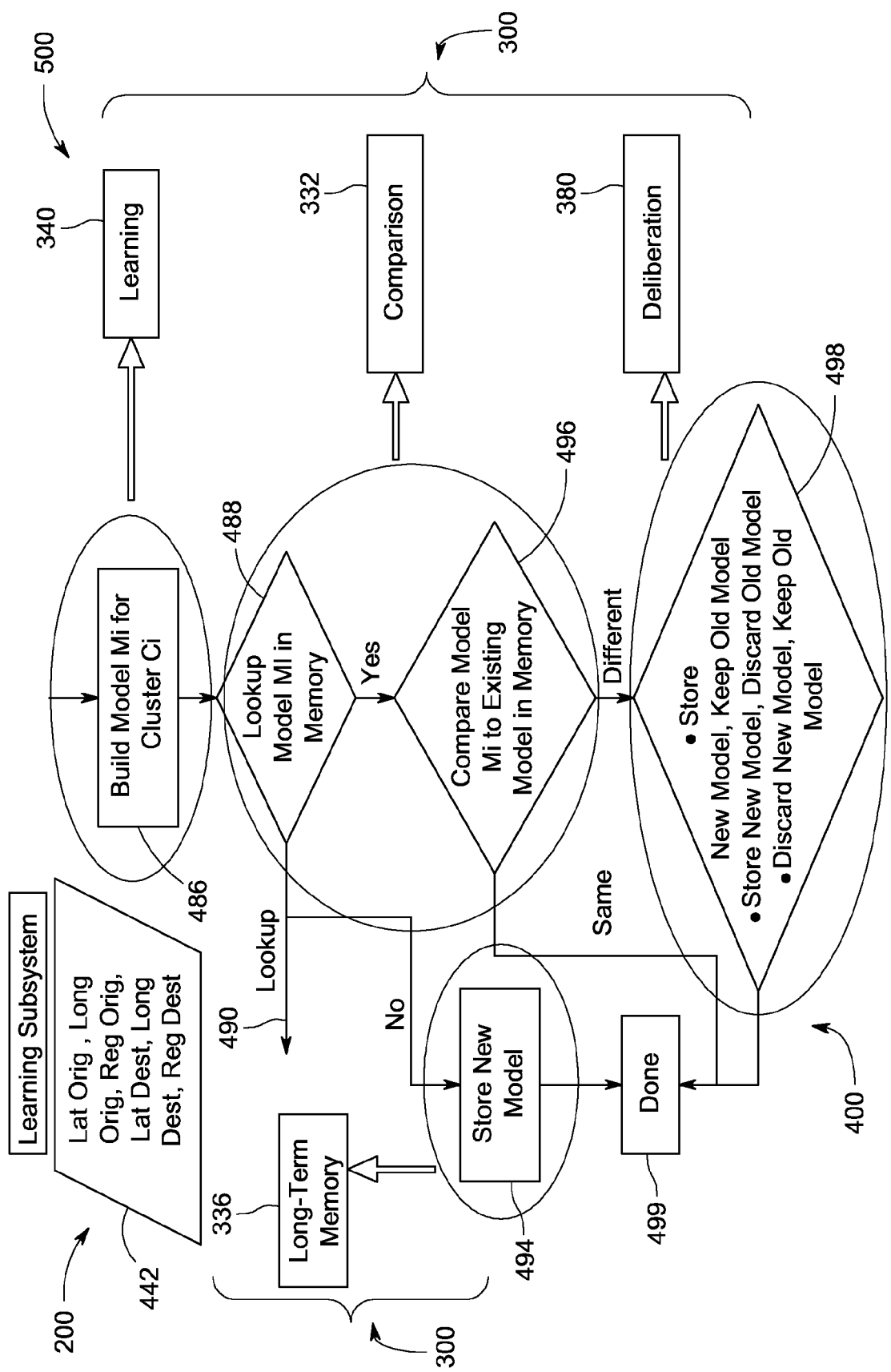
FIG. 8 is a schematic view of an exemplary learning sub-system architecture that may be used with the functional logic architecture shown in FIG. 6 in relationship to the high-level cognitive architecture shown in FIG. 3.

FIG. 8 is a schematic view of an exemplary learning subsystem architecture 500 that may be used with functional logic architecture 400 in relationship to high-level cognitive architecture 300. Learning subsystem architecture 500 performs adaptive on-line learning of adaptive cognitive system 200. FIG. 8 shows a portion of functional logic architecture 400, i.e., learning subsystem 500, with greater granularity.

In the exemplary embodiment, model building function block 486 is associated with learning sub-module 340. Also, model lookup function block 488 and model comparison function block 496 are associated with comparison sub-module 332. Further, decision function block 498 is associated with deliberation sub-module 380. Moreover, storage function block 494 is associated with memory sub-module 336.

Figure 9:
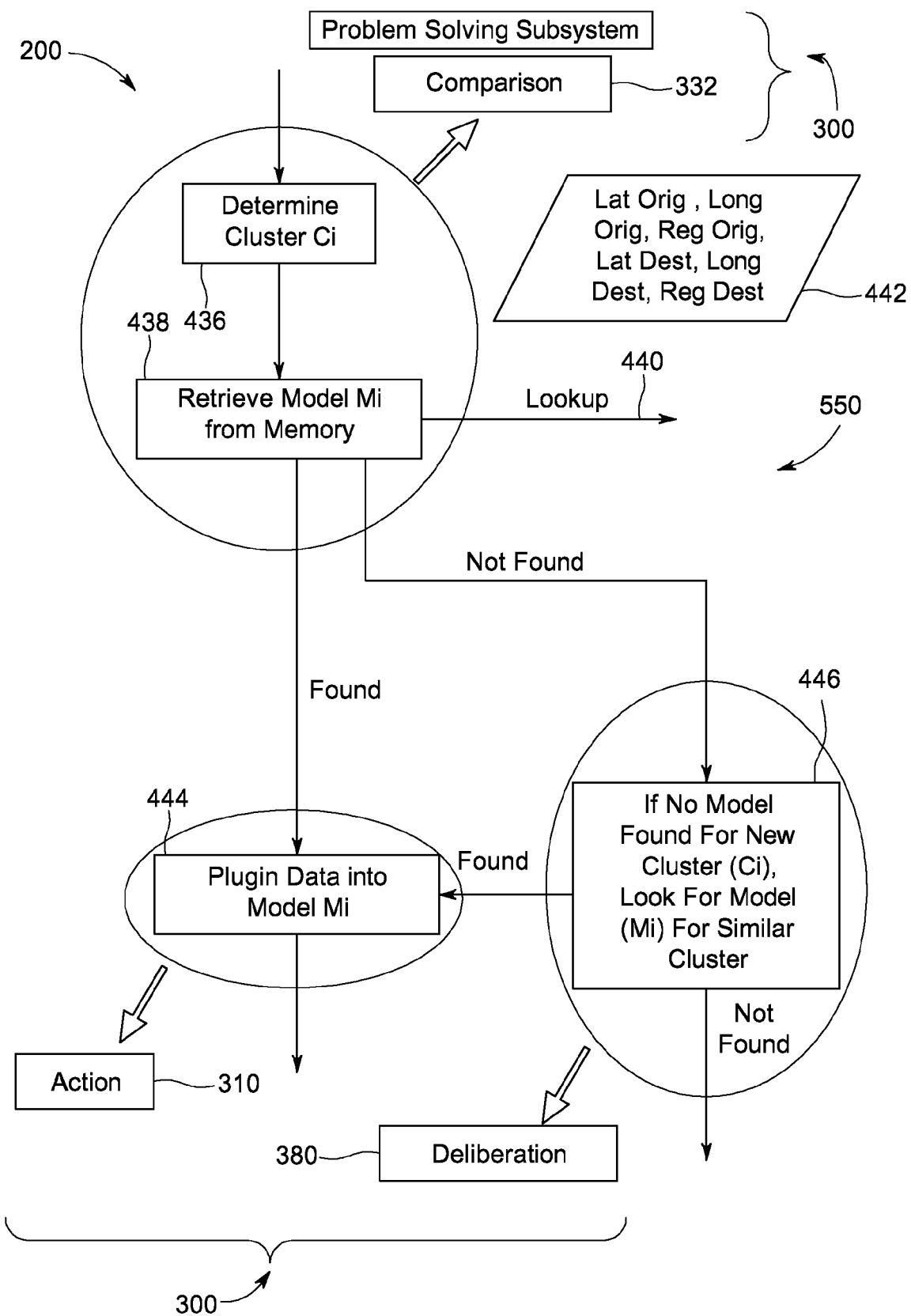
FIG. 9 is a schematic view of an exemplary problem solving subsystem architecture that may be used with the functional logic architecture shown in FIG. 6 in relationship to the high-level cognitive architecture shown in FIG. 3.

FIG. 9 is a schematic view of an exemplary problem solving subsystem architecture 550 that may be used with functional logic architecture 400 in relationship to high-level cognitive architecture 300. Problem solving subsystem architecture 550 cooperates with learning subsystem architecture 500 (shown in FIG. 8) to execute adaptive on-line learning of adaptive cognitive system 200. FIG. 8 shows a portion of functional logic architecture 400, i.e., problem solving subsystem 550, with greater granularity.

In the exemplary embodiment, cluster determination function block 436 and model retrieval function block 438 are associated with comparison sub-module 332. Also, data plug-in function block 444 is associated with action sub-module 310. Further, model lookup function block 446 is associated with deliberation sub-module 380.

Referring to FIGS. 3, 8, and 9 together, learning subsystem 500 and problem solving subsystem 550 together include comparison sub-module 332, memory sub-module 336, learning sub-module 340, deliberation sub-module 380, and action sub-module 310 to leverage feedback 314 from real world 304 to facilitate system 200 in self-adapting through learning and problem solving mechanisms. Feedback 314 is based on either actions that system 200 took or changes in the associated environment of real world 304 due to other external events either from the environment or other agents interacting with system 200.

In the exemplary embodiment, learning subsystem 500 and problem solving subsystem 550 cooperate to use at least one of three learning modes, i.e., supervised leaning mode, semi-supervised learning mode, and reinforcement learning mode. To facilitate continuous learning within system 200. Supervised learning mode defines a class of machine learning techniques. Supervised learning mode uses supervised training methods to generate sets of clusters $C_i$ and models $M_i$ from supervised training data, i.e., labeled input data wherein associated desired output values are provided with the training data. User-controlled labeled data insertion into learning sequence 404 (shown in FIG. 6) is an example of the supervised learning mode.

Semi-supervised learning mode defines a class of machine learning techniques that make use of both labeled and unlabeled data for training, wherein at least a portion of the input training data is labeled data and the remainder of the training data is unlabeled data. User-controlled labeled and unlabeled data insertion into learning sequence 404 (shown in FIG. 6) is an example of the semi-supervised learning mode. Moreover, insertion of user-inserted labeled data and unlabeled numerical data collected through sensory input sub-module 306 facilitates system 200 adaptively learning by generating sets of clusters $C_i$ and models $M_i$ from both the labeled and unlabeled training data.

Reinforcement learning mode defines a class of machine learning techniques that is concerned with how an agent ought to take actions in an environment so as to maximize some notion of reward. In the exemplary embodiment, system 200 uses reinforcement learning techniques that are based on reward or penalties to generate an emotional response from emotion sub-module 330. Also, emotion sub-module 330 responds to criticisms from either real world 304 or an input entity, i.e., a human or another system.

Referring to FIGS. 8 and 9, lookup action 440 (associated with model retrieval function block 438) and lookup action 490 (associated with model lookup function block 488) are performed using the SDM features of memory sub-module 336. Also, learning sub-module 340 (associated with model building function block 486) uses at least one of an artificial neural network (ANN) and a support vector machine (SVM) to execute the assigned functions. Further, comparison sub-module 332 (associated with model comparison function block 496 and cluster determination function block 436) uses a SVM to execute the assigned functions. Moreover, deliberation sub-module 380 (associated with model lookup function block 446) uses a genetic algorithm (GA) to execute the assigned functions. ANNs, SVMs, and GAs are discussed further below.

Figure 10:
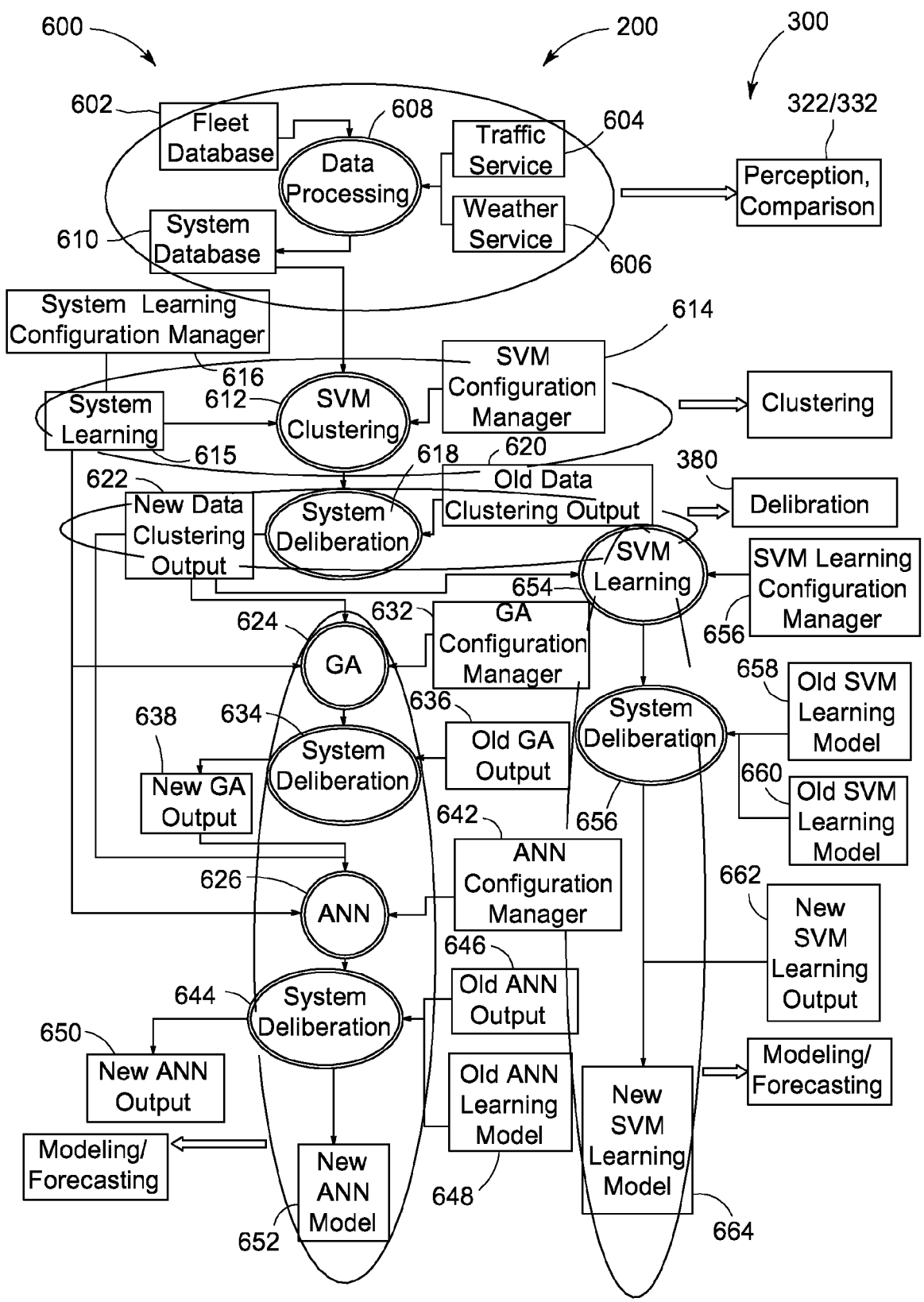
FIG. 10 is a flow chart of an exemplary input and output (I/O) architecture that may be used with the functional logic architecture shown in FIGS. 6 and 7.

FIG. 10 is a flow chart of an exemplary input and output (I/O) architecture 600 that may be used with functional logic architecture 400 (shown in FIGS. 6 and 7). More specifically, I/O architecture 600 represents the I/O data flow associated with learning activities of system 200. Learning in system 200 involves both focused attention to the data flow associated with the learning process and peripheral perception, i.e., the ability to recognize pertinent data while not necessarily focusing on such data.

In at least some embodiments, adaptive cognitive system 200 is defined by three functional layers in a model-view-controller (MVC) pattern. The three layers are the Web user interface (UI) layer (for the "view"), a controller middle layer (for the "controllers"), and algorithms (for the "model"). As is known in the art of computing system design and implementation, a variety of methods to implement a system are available. The plurality of input entities in real world 304 and edge module 302 (both shown in FIG. 3), including, without limitation, plurality of edge devices 303 (shown in FIG. 3) that facilitate coupling of system 200 to real world 304 (shown in FIG. 3), and sensory input sub-module 306 (shown in FIG. 3) configured to receive inputs from the input entities.

Also, in at least some embodiments, without limitation, Java® is used to implement the middle layer, and system 200 operates in a plurality of modes including a learning mode, a forecasting mode, and a deliberation mode. These three modes include a plurality of decision points. The modes and decision points are described in detail below.

In the exemplary embodiment, and in the context of asset management, and more specifically, supply chain management, I/O architecture 600 includes a fleet database 602, a traffic service 604, and a weather service 606 coupled to a data processing node 608. Alternatively, any type inputs and any number of inputs are used that enable operation of system 200 as described herein. Fleet database 602, traffic service 604, weather service 606 and data processing node 608 are associated with perception sub-module 322 and comparison sub-module 332 (both shown in FIG. 3). Also, the data inputs from fleet database 602, traffic service 604, and weather service 606 are transmitted through sensory input sub-module 306 in edge module 302 (both shown in FIG. 3). Such data processing in system 200 creates an input file structure (not shown) within a system database 610, and preprocesses the data into valid trips.

Also, in the exemplary embodiment, data from system database 610 is transmitted to an SVM clustering node 612 that is configured through a SVM configuration manager 614. SVM clustering node 612 is coupled to a system learning controller 615 that is configured through a system learning configuration sub-module 616. SVM clustering node 612 and SVM configuration manager 614 are associated with at least one clustering algorithm (discussed further below). SVM clustering node 612 generates data clusters (not shown) based on at least one data attribute and transmits the data clusters to a system deliberation node 618. Clustering of trips is typically based on similarities that include, without limitation, region, time, weather conditions, and traffic conditions. System deliberation node 618 is coupled to a plurality of old data clustering output registers 620, wherein the data cluster outputs from node 612 are evaluated against older data clusters, and if necessary, a decision is made as to whether the new data clusters may be transmitted as is, modified, or deleted. System deliberation node 618 transmits the new data clusters to a plurality of new data clustering output registers 622. Node 618 and registers 620 and 622 are associated with deliberation sub-module 380 (shown in FIG. 3).

The new data clustering output is transmitted from registers 622 to at least one of three branches, i.e., to a genetic algorithm (GA) branch 624, an artificial neural network (ANN) branch 626, and a SVM learning branch 628. GA branch 624 includes a GA node 630 coupled to learning sub-module 340, new data clustering output registers 622, and a GA configuration manager 632. GA node 630 generates a model based on the clustered data input, for example, without limitation, a shipping itinerary for a package. The model output is transmitted to a system deliberation node 634. System deliberation node 634 is coupled to a plurality of old GA output registers 636, wherein the GA model outputs from node 630 are evaluated against older GA models, and if necessary, a decision is made as to whether the new GA models may be transmitted as is, modified, or deleted. System deliberation node 634 transmits the new GA models to a plurality of new GA output registers 638.

ANN branch 626 includes an ANN node 640 coupled to learning sub-module 340, new GA output registers 638, and an ANN configuration manager 642. ANN node 640 generates a forecast based on the model input, for example, without limitation, an ETA for delivery of a package. The forecast output is transmitted to a system deliberation node 644. System deliberation node 644 is coupled to a plurality of old ANN output registers 646 and a plurality of old ANN learning model registers 648, wherein the ANN forecast outputs from node 640 are evaluated against older ANN forecasts, and if necessary, a decision is made as to whether the new ANN forecasts may be transmitted as is, modified, or deleted. System deliberation node 644 transmits the new ANN forecasts to a plurality of new ANN output registers 650 and a new ANN model register 652.

SVM branch 628 includes a SVM learning node 654 coupled to new data clustering output registers 622 and a SVM learning configuration manager 656. SVM learning node 654 generates a learning model output that is transmitted to a system deliberation node 634. System deliberation node 634 is coupled to a plurality of old SVM learning output registers 658 and a plurality of old SVM learning model registers 660, wherein the SVM learning model outputs from node 656 are evaluated against older SVM learning models, and if necessary, a decision is made as to whether the new SVM learning model outputs may be transmitted as is, modified, or deleted. System deliberation node 634 transmits the new SVM learning model outputs to a plurality of new SVM learning output registers 662 and a new SVM learning model register 664. The new SVM learning model outputs are primarily used for forecasting and clustering.

Operation of I/O architecture 600 of system 200 is facilitated by a controller hierarchy (not shown). There are four controllers, i.e., a system controller, learning controller 615, a forecasting controller, and a deliberation controller. Learning controller 615 is the controlling authority for the learning mode of system 200. It invokes the corresponding SVM configuration manager 614, system learning configuration manager 616, and SVM learning configuration manager 656 for the execution of the associated learning processes. The forecasting controller is the controlling authority for the forecasting mode of system 200. It invokes the corresponding GA configuration manager 632. The forecasting controller creates the input file from the inputs provided by a UI (the first layer), e.g., without limitation, Web UI, and controls ANN branch 626, including ANN configuration manager 642, when system 200 is in forecasting mode. The deliberation controller is the controlling authority for the deliberation mode of system 200, i.e., it controls system deliberation nodes 618, 634, 644, and 656. The system controller is the main controller and controls the other three controllers.

Figure 11:
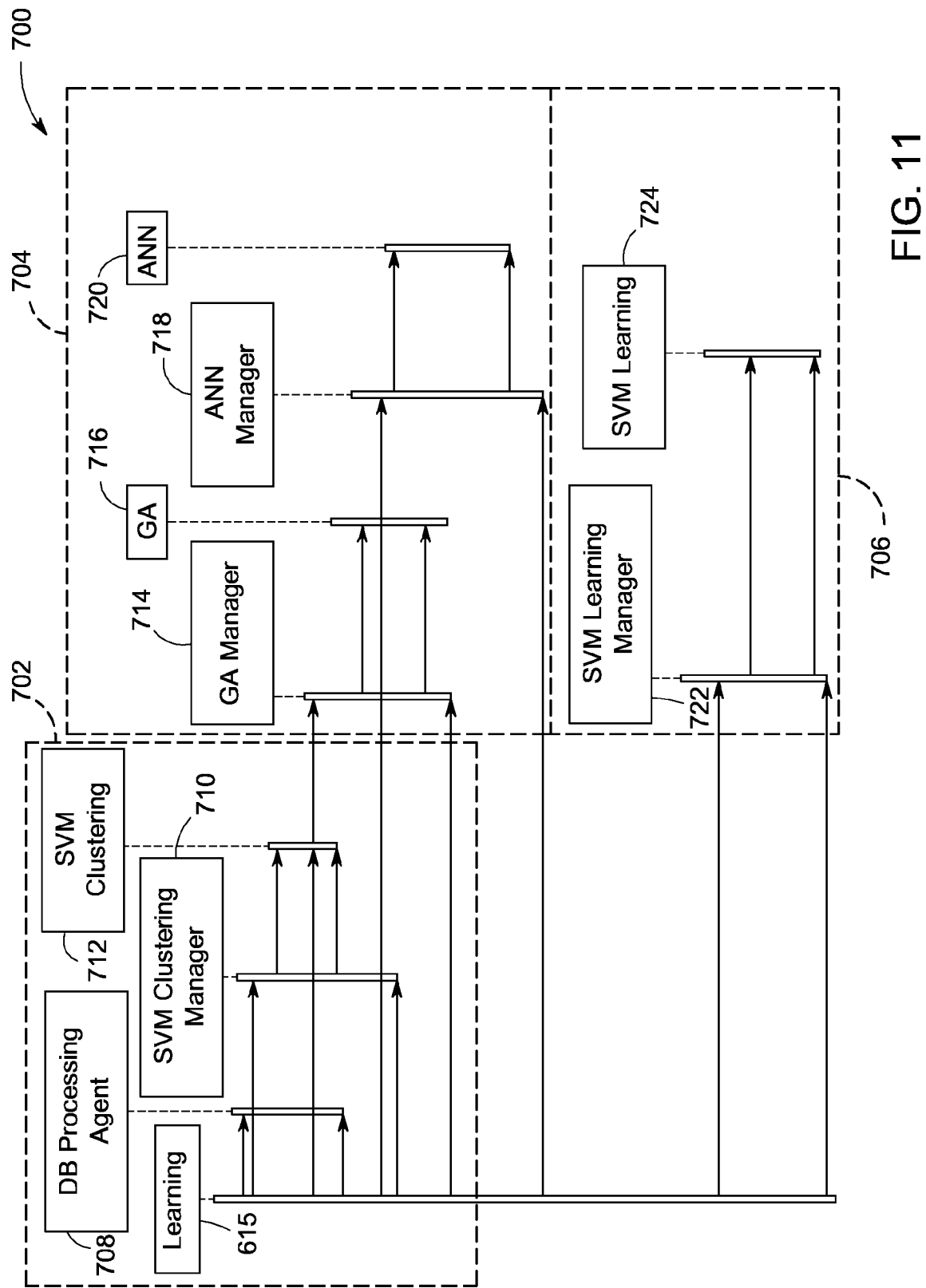
FIG. 11 is a flow chart of an exemplary implementation of a learning controller sequence that may be used with the I/O architecture shown in FIG. 10.
Figure 12:
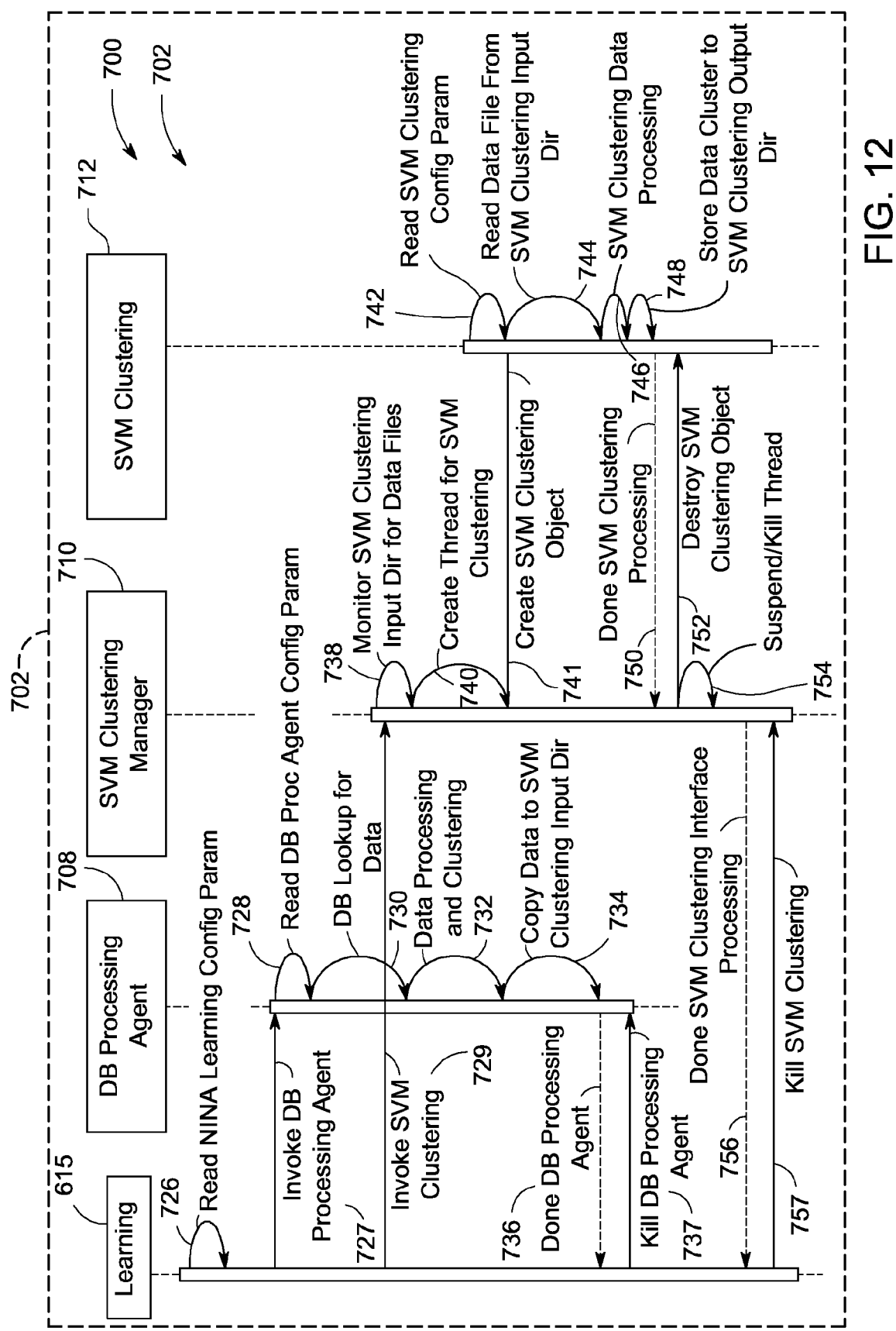
FIG. 12 is a flow chart of an exemplary support vector machine (SVM) clustering portion of the learning controller sequence shown in FIG. 11.
Figure 13:
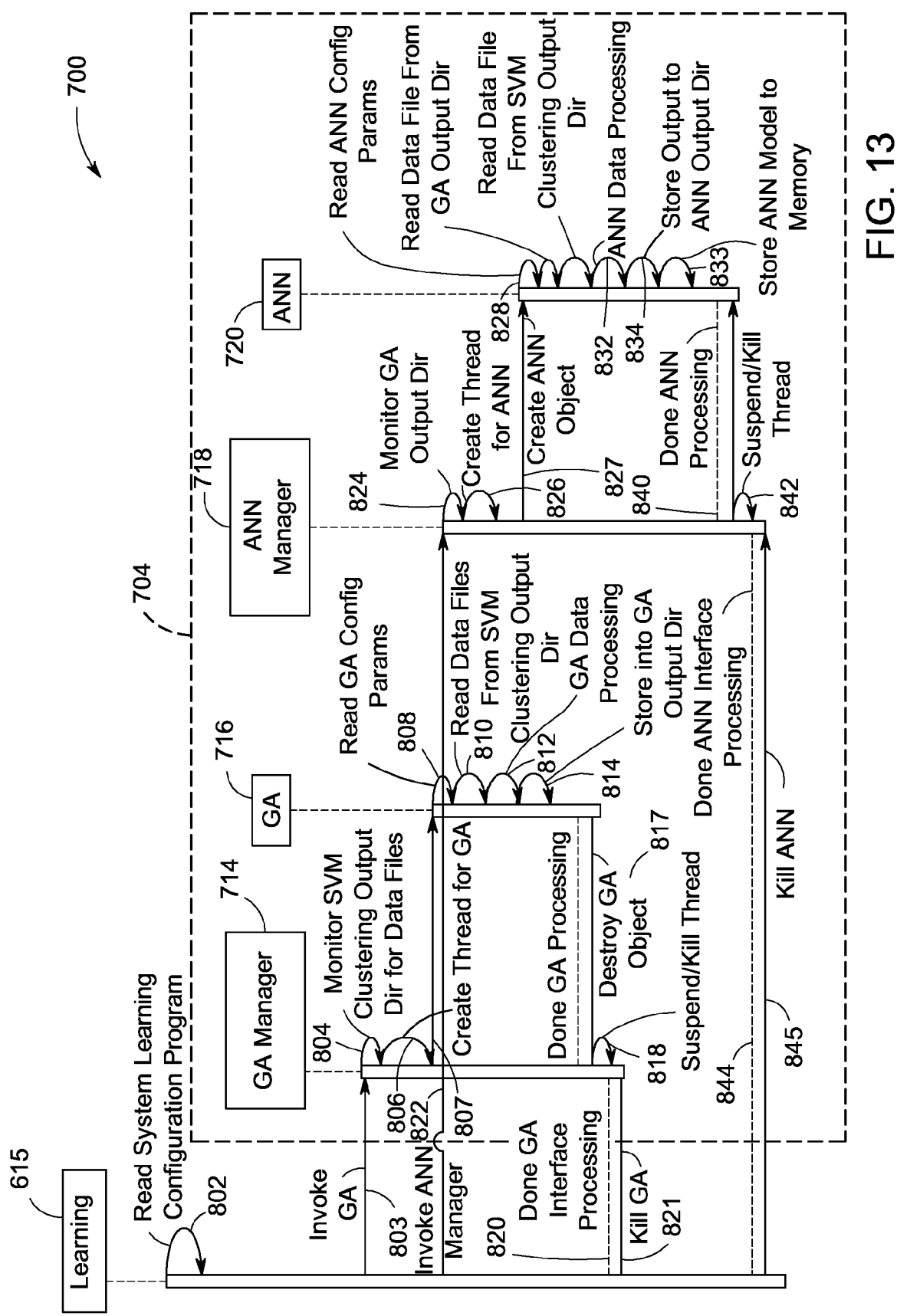
FIG. 13 is a flow chart of an exemplary artificial neural network (ANN) and genetic algorithm (GA) portion of the learning controller sequence shown in FIG. 11.
Figure 14:
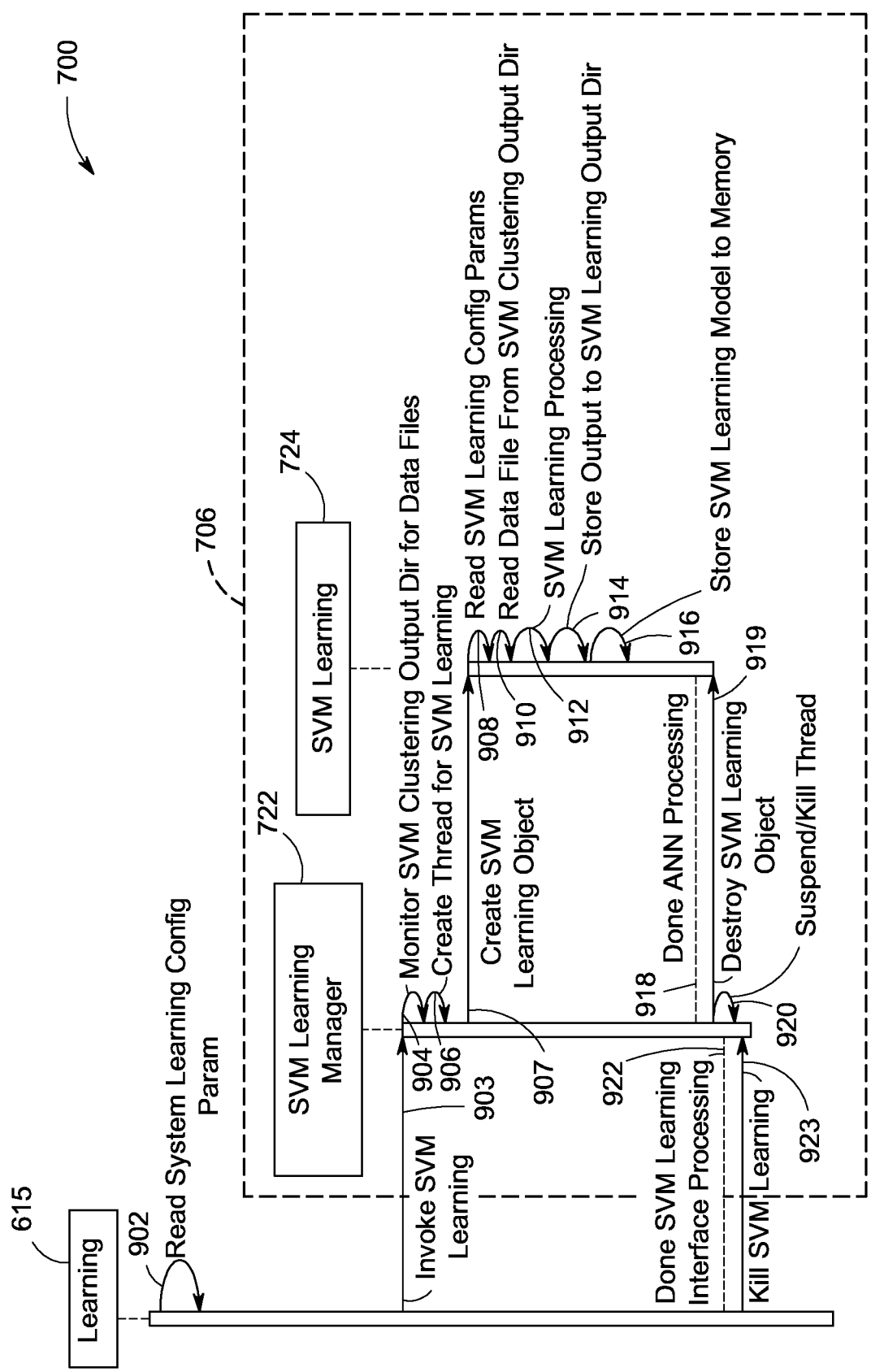
FIG. 14 is a flow chart of an exemplary SVM learning portion of the learning controller sequence shown in FIG. 11.

FIG. 11 is a flow chart of an exemplary implementation of a learning controller sequence 700 that may be used with I/O architecture 600 (shown in FIG. 8). FIG. 12 is a flow chart of an exemplary support vector machine (SVM) clustering sequence 702 of learning controller sequence 700. FIG. 13 is a flow chart of an exemplary artificial neural network (ANN)

and genetic algorithm (GA) sequence 704 of learning controller sequence 700. FIG. 14 is a flow chart of an exemplary SVM learning sequence 706 of learning controller sequence 700.

In at least some embodiments, learning controller sequence 700, i.e., the sequence of operations associated with system learning controller 615 when system 200 is in the learning mode, uses a plurality of algorithms implemented in the third layer of system 200, thereby providing the "model" portion of the model-view-controller (MVC) pattern. As is known in the art of computing system design and implementation, a variety of methods to implement a system are available. Also, in general, the middle layer is developed in Java® while the third, i.e., algorithm layer is developed using C++. The interaction between Java® and C++ is achieved using Java® Native Interface (JNI). Alternatively, any computer languages are used in any configuration that enable operation of system 200 as described herein.

Referring to FIG. 11, in the exemplary embodiment, learning controller sequence 700 includes SVM clustering sequence 702, ANN and GA sequence 704, and SVM learning sequence 706. SVM clustering sequence 702 includes system learning controller 615, a database processing agent 708, a SVM clustering manager 710, and a SVM clustering sub-sequence 712. ANN and GA sequence 704 includes a GA manager 714, a GA sub-sequence 716, an ANN manager 718, and an ANN sub-sequence 720. SVM learning sequence 706 includes a SVM learning manager 722 and a SVM learning sub-sequence 724. While a particular sequence using SVM, ANN, and GA is described herein, as is known in the art of computing system design and implementation, a variety of methods to implement a system are available. Therefore, some embodiments use any sequence of SVM, ANN, and GA, including only one or two of the three, that system 200 deems necessary for the current operational issues being managed by system 200. Moreover, while SVM, ANN, and GA are described herein in detail, other sequences may be used to enable operation of system 200 as described herein.

In the exemplary embodiment, learning controller sequence 700 includes five managers, i.e., SVM clustering manager 710, GA manager 714, ANN manager 718, SVM learning manager 722, and an abstract manager (not shown) that implements the basic functionality of managers 710, 714, 718, and 722, wherein managers 710, 714, 718 and 722 inherit the functionality of the abstract manager. Managers 710, 714, 718, and 722 facilitate thread management and the associated logic. In the exemplary embodiment, thread management is facilitated through dynamic thread creation, wherein the threads are created as they are needed and once the thread finishes its execution, the thread is destroyed. Alternatively, thread management is facilitated through a thread pool, wherein a thread pool is created during initialization of system 200, or the learning mode thereof, and the threads are used from this pool as, and when, required. The threads are created in the thread pool in a suspend status and they will be active whenever there is a request for the thread.

In the exemplary embodiment, each thread class implements JNI functions for bi-directional interaction with C++ dlls to facilitate bi-directional communication between C++ dlls in the third layer and Java® in the second layer. The threads are created and managed by algorithms implemented specifically for each associated thread.

Also, in the exemplary embodiment, system learning controller 615 starts each of SVM clustering manager 710, GA manager 714, ANN manager 718, SVM learning manager 722 in the learning mode. Managers 710, 714, 718, and 722 wait for input files to be transmitted into their respective input directories. For example, data processing agent 708 transmits the necessary input files to SVM clustering sequence 712 for clustering the received data and SVM clustering sequence 712 generates data clusters based on the data input received using an SVM clustering algorithm. The output, i.e., data clusters of SVM clustering sub-sequence 712 is the input for GA manager 714 and GA sub-sequence 716 that generate at least one model from the data clusters using a GA algorithm. The output, i.e., models of GA sub-sequence 716 is the input for ANN manager 718 and ANN sub-sequence 720. ANN manager 718 and ANN sub-sequence 720 receives the input models from GA sub-sequence 716, processes the models, and produces an output, e.g., a forecast using an ANN algorithm. This forecast is normally used for the forecasting mode of system 200. Moreover, SVM learning manager 722 and SVM learning sub-sequence 724 include an SVM learning algorithm, which runs parallel to GA sub-sequence 716 and ANN sub-sequence 720. SVM learning manager 722 receives the output, i.e., data clusters of SVM clustering sub-sequence 712 and generates a model that can be used for forecasting and clustering.

Referring to FIG. 12, the interaction of system learning controller 615 and SVM clustering manager 710 and SVM clustering sub-sequence 712 in SVM clustering sequence 702 is shown. Execution of SVM clustering sequence 702 is closely associated with SVM clustering node 612 (shown in FIG. 10). In operation, system learning controller 615 reads 726 system learning configuration parameters from system learning configuration manager 616 (shown in FIG. 8) into memory sub-module 336 (shown in FIG. 3) and invokes 727 database processing agent 708. Database processing agent 708 reads 728 the database processing agent configuration parameters into memory sub-module 336 and invokes 729 SVM clustering manager 710. Database processing agent 708 executes 730 a lookup for data in system database 610 (shown in FIG. 10), processes and at least partially clusters 732 the data called from database 610, and copies 734 the data to an SVM clustering input directory (not shown). Operation of database processing agent 708 is then completed 736, i.e., database processing agent 708 is "killed" 737.

Also, in operation, SVM clustering manager 710 is fed-forward the command to execute 730 a lookup for data in system database 610 from database processing agent 708. Such execution 730 facilitates SVM clustering manager's 710 anticipation of data receipt therefrom, i.e., SVM clustering manager 710 monitors 738 the SVM clustering input directory for data files transmitted from database processing agent 708. The features of the abstract manager (not shown) are extended into SVM clustering manager 710 and manager 710 provides the functionality for incoming data monitoring and thread management. SVM clustering manager 710 generates 740 at least one thread (not shown) for SVM clustering using a SVM clustering algorithm. SVM clustering manager also creates 741 at least one SVM clustering object to facilitate generating the desired data clusters. The number of threads created will be based on the number of data files that will be processed in SVM clustering sequence 702.

Further, in operation, SVM clustering sub-sequence 712 is initiated through receipt of the clustering object. In SVM clustering sub-sequence 712, the SVM clustering configuration parameters are read 742 into memory sub-module 336 and the data files from the SVM clustering input directory are read 744 into memory sub-module 336. The SVM clustering data is processed 746 to define at least one data cluster for use within ANN and GA sequence 704 (shown in FIG. 11). The data clusters are stored 748 in the SVM clustering output directory (not shown).

Moreover, in operation, once the data clusters are stored 748, operation of SVM clustering processing is completed 750, the SVM clustering object is "destroyed" 752 and the SVM clustering thread is either "killed" or "suspended" 754. Operation of SVM clustering interface processing is then completed 756, i.e., SVM clustering manager 710 is "killed" 757.

Referring to FIG. 13, the interaction of system learning controller 615 and GA manager 714, GA sub-sequence 716, ANN manager 718, and ANN sub-sequence 720 in ANN and GA sequence 704 is shown. Execution of GA sub-sequence 716 is closely associated with GA node 630 (shown in FIG. 10) and execution of ANN sub-sequence 720 is closely associated with ANN node 640 (shown in FIG. 10). In operation, system learning controller 615 reads 802 system learning configuration parameters from system learning configuration manager 616 (shown in FIG. 10) into memory sub-module 336 (shown in FIG. 3) and invokes 803 GA manager 714. The features of the abstract manager (not shown) are extended into GA manager 714 and manager 714 provides the functionality for incoming data monitoring and thread management. GA manager 714 monitors 804 the SVM clustering output directory (not shown) for data clusters stored 748 (shown in FIG. 10) in the SVM clustering output directory.

Also, in operation, GA manager 714 generates 806 at least one thread (not shown) for GA model formation using a GA algorithm. GA manager 714 also creates 807 at least one GA object to facilitate generating the desired models. The number of threads created will be based on, for example, without limitation, the number of data files that will be processed in GA sub-sequence 716.

Further, in operation, GA sub-sequence 716 is initiated through receipt of the GA object. In GA sub-sequence 716, the GA configuration parameters are read 808 into memory sub-module 336 and the data files from the SVM clustering output directory are read 810 into memory sub-module 336. The SVM clustering output data is processed 812 to define at least one data model for use within ANN sub-sequence 720. The data models are stored 814 in the GA output directory (not shown).

Moreover, in operation, once the data models are stored 814, the GA processing is completed 816, the GA object is "destroyed" 817 and the GA thread is either "killed" or "suspended" 818. Operation of GA interface processing is then completed 820, i.e., GA manager 714 is "killed" 821.

Continuing to refer to FIG. 13, in operation, system learning controller 615 reads 802 system learning configuration parameters from system learning configuration manager 616 into memory sub-module 336 and invokes 822 ANN manager 718. The features of the abstract manager (not shown) are extended into ANN manager 718 and manager 718 provides the functionality for incoming data monitoring and thread management. ANN manager 718 monitors 824 the GA output directory for data models stored 814 in the GA output directory.

Also, in operation, ANN manager 718 generates 826 at least one thread (not shown) for ANN model formation using an ANN algorithm. ANN manager 718 also creates 827 at least one ANN object to facilitate generating the desired models. The number of threads created will be based on, without limitation, the number of data files that will be processed in ANN sub-sequence 720.

Further, in operation, in ANN sub-sequence 720, the ANN configuration parameters are read 828 into memory sub-module 336 and the data files from the GA output directory are read 830 into memory sub-module 336 and the data files from the SVM clustering output directory are read 832 into memory sub-module 336. The GA output data and the SVM clustering output data is processed 834 to define at least one data model for forecasting and clustering use within system 200. The data models are stored 836 in the ANN output directory (not shown) and stored 838 in memory 336.

Moreover, in operation, once the data models are stored 836 and 838, the ANN processing is completed 840, the ANN object is "destroyed" and the ANN thread is either "killed" or "suspended" 842. Operation of ANN interface processing is then completed 844, i.e., ANN manager 718 is "killed" 845.

Referring to FIG. 14, the interaction of system learning controller 615 and SVM learning manager 722 and SVM learning sub-sequence 724 in SVM learning sequence 706 is shown. Execution of SVM learning sub-sequence 722 is closely associated with SVM learning node 654 (shown in FIG. 10). In operation, system learning controller 615 reads 902 system learning configuration parameters from system learning configuration manager 616 (shown in FIG. 10) into memory sub-module 336 (shown in FIG. 3) and invokes 903 SVM learning manager 722. The features of the abstract manager (not shown) are extended into SVM learning manager 722 and manager 722 provides the functionality for incoming data monitoring and thread management. SVM learning manager 722 monitors 904 the SVM clustering output directory (not shown) for data clusters stored 748 (shown in FIG. 12) in the SVM clustering output directory.

Also, in operation, SVM learning manager 722 generates 906 at least one thread (not shown) for SVM learning using a SVM learning algorithm. SVM learning manager 722 also creates 907 at least one SVM learning object to facilitate generating the desired models. The number of threads created will be based on, without limitation, the number of data files that will be processed in SVM learning sub-sequence 724.

Further, in operation, in SVM learning sub-sequence 724, the SVM learning configuration parameters are read 908 into memory sub-module 336 and the data files from the SVM clustering output directory are read 910 into memory sub-module 336. The SVM clustering output data is processed 912 to define at least one data model for training and forecasting use within system 200. The data models are stored 914 in the SVM learning output directory (not shown) and stored 916 in memory 336.

Moreover, in operation, once the data models are stored 914 and 916, the SVM learning processing is completed 918, the ANN object is "destroyed" 919, and the ANN thread is either "killed" or "suspended" 920. Operation of SVM learning interface processing is then completed 922, i.e., SVM learning manager 722 is "killed" 923.

Figure 15:
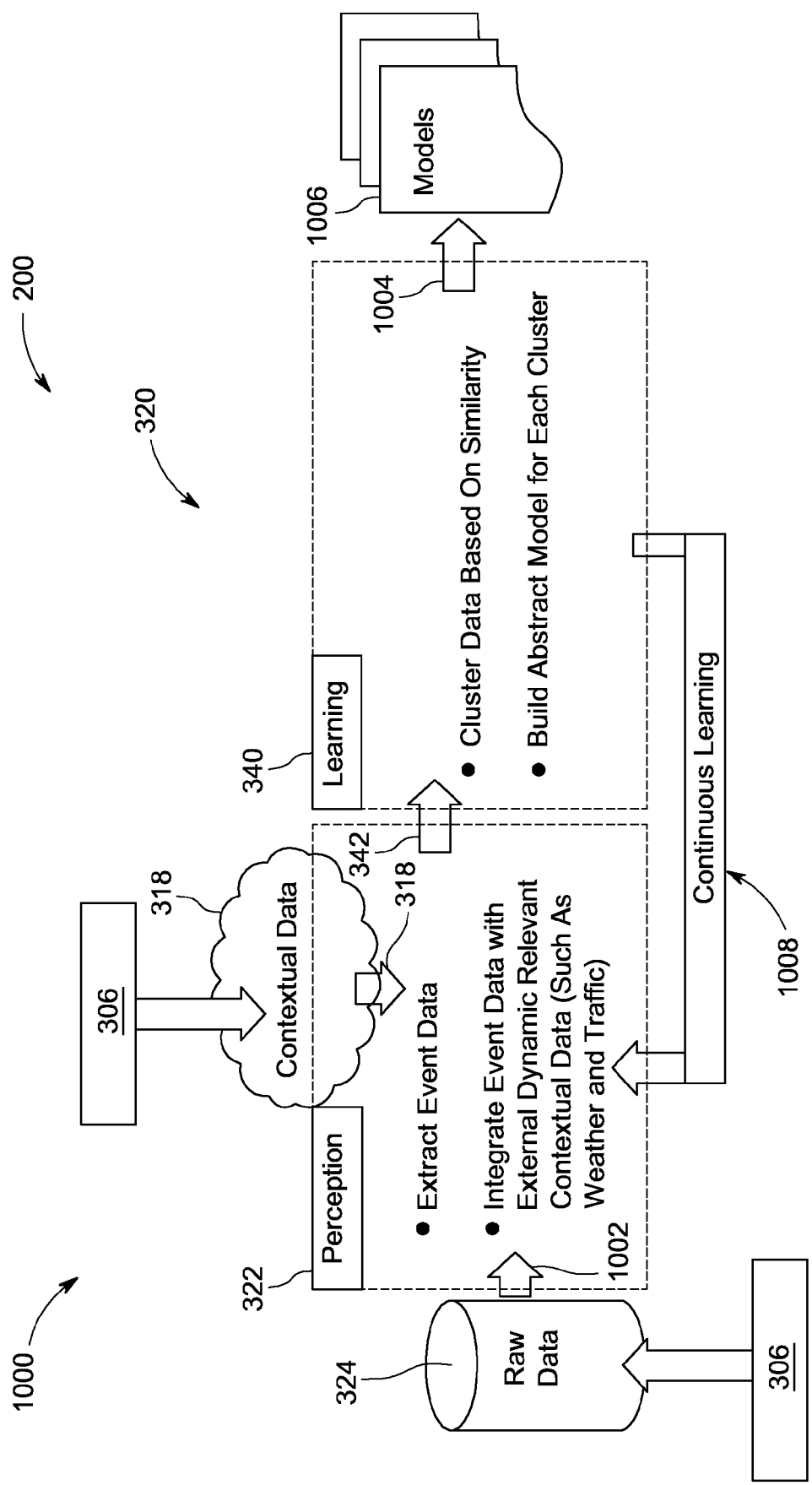
FIG. 15 is a flow chart of an exemplary model of generalized continuous learning that may be used with the adaptive cognitive system shown in FIG. 2.

FIG. 15 is a flow chart of an exemplary model 1000 of generalized continuous learning that is integral to adaptive cognitive system 200. In the exemplary embodiment, raw data 324 representative of real world 304 (shown in FIG. 3) is received by sensory input sub-module 306. Raw data 324 includes event data 1002 that is representative of feedback 314 (shown in FIG. 3) from real world 304 as a function of directives 311 transmitted from action sub-module 310 (both shown in FIG. 3). Perception sub-module 322 receives raw data 324 from sensory input sub-module 306 and extracts event data 1002 from raw data 324. Also, external, dynamic, relevant, contextual data 318 is received by sensory input sub-module 306, wherein such data 318 includes, without limitation, real-time data weather and traffic data received from weather service 606 and traffic service 604 (both shown in FIG. 10). Perception sub-module 322 receives contextual data 318 and integrates event data 1002 with contextual data 318 to form portion 342 of incoming data 318 and 324, thereby executing actions associated with data processing node 608 (shown in FIG. 10).

Also, in the exemplary embodiment, data portion 342 is transmitted to learning sub-module 340 from perception sub-module 322. Data clusters are formed based on at least one similar attribute through the use of SVM clustering node 612 (shown in FIG. 10) and SVM clustering sequence 702 (shown in FIGS. 11 and 12). The data clusters are used to build an abstract model 1004 for each data cluster through use of GA node 630, ANN node 640, and SVM learning node 654 (all three shown in FIG. 10), and ANN and GA sequence 704 (shown in FIGS. 11 and 13) and SVM learning sequence 706 (shown in FIGS. 11 and 14). Each model 1004 is stored with a plurality of models 1006.

Further, in the exemplary embodiment, when models 1006 are used for subsequent activities, data portions 1002 resulting from such activities are used to either generate new models 1004 or modify existing models 1006. Therefore, system 200 facilitates a continuous learning loop 1008 that continuously adapts system 200 to dynamic environmental conditions in real world 304.

Figure 16:
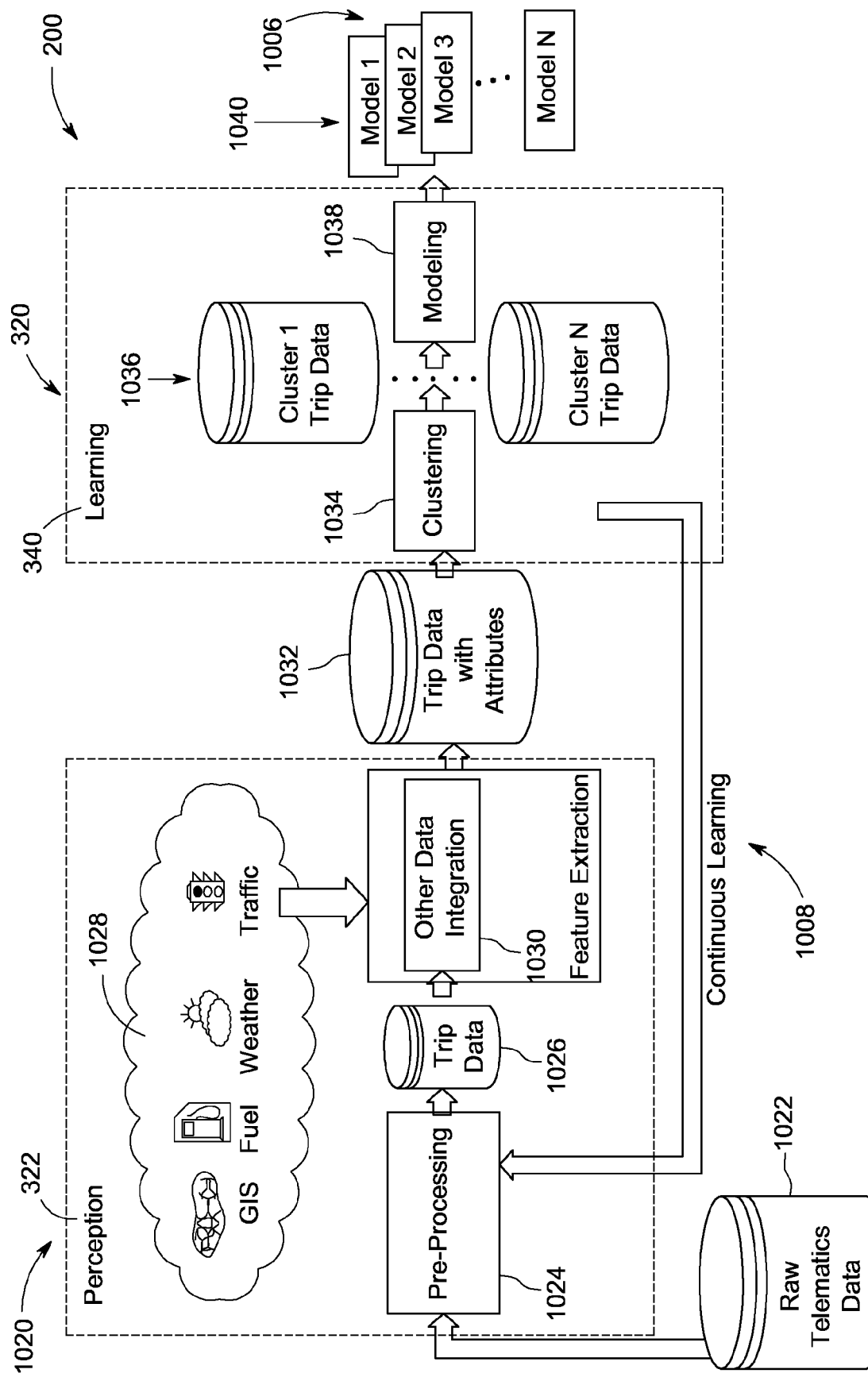
FIG. 16 is a flow chart of an exemplary model of learning during execution of a plan, and adapting to changes in the plan, wherein the plan includes multiple shipping routes and trips, such model may be used with the adaptive cognitive system shown in FIG. 2.

FIG. 16 is a flow chart of an exemplary model 1020 of learning during execution of a plan, including adapting to changes in the plan, wherein the plan includes multiple shipping routes and trips, wherein such model 1020 may be used with intelligent, neuromorphic, cognitive system 200. In the exemplary embodiment, raw telematics data 1022 representative of real world 304 (shown in FIG. 3) shipping data is received by sensory input sub-module 306 (shown in FIGS. 3 and 15). Such raw telematics data 1012 includes, without limitation, GPS data and remote diagnostics data, e.g., remaining fuel. Raw telematics data 1022 is transmitted to a preprocessing function block 1024 in perception sub-module 322. Function block 1024 performs verification of data completeness in a manner similar to that described for data check function block 416 in production sequence 402 (both shown in FIG. 6) as well as other data preprocessing tasks. The preprocessed data is transmitted to memory sub-module 336 (shown in FIG. 3) to be at least temporarily stored as valid trip data 1026. In general, collection of data 1022 uses a focused attention of system 200, such focused attention facilitating robust learning in system 200.

Also, in the exemplary embodiment, external, dynamic, relevant, contextual data 1028 is received by sensory input sub-module 306 and transmitted to perception sub-module 322. Contextual data 1028 includes, without limitation, real-time data weather and traffic data received from weather service 606 and traffic service 604 (both shown in FIG. 10), geographic information system (GIS) data, and fuel availability and price data. Such contextual data represents at least one peripheral perception feature of system 200, such peripheral perception facilitating robust learning in system 200. A data integration function block 1030 in perception sub-module 322 receives contextual data 1028, integrates the preprocessed data with contextual data 1018, and extracts similar features of data 1028 to form trip data with attributes 1032. The attributes may include, without limitation, geographical region, time, weather patterns, traffic patterns, and mileage.

Further, in the exemplary embodiment, trip data with attributes 1032 is transferred and in integrated with contextual data 318 and then all is transmitted to learning sub-module 340 from perception sub-module 322 to a clustering function block 1024. Clustering function block 1034 includes the functionality described for SVM clustering node 612 (shown in FIG. 10) and SVM clustering sequence 702 (shown in FIGS. 11 and 12). Data clusters 1036 of trip data 1032 are formed based on at least one of the similar attributes described above through the use of SVM clustering node 612 (shown in FIG. 10) and SVM clustering sequence 702 (shown in FIGS. 11 and 12). Data from each trip from trip 1 to trip N is clustered, wherein N is a whole number. Data clusters 1036 are transmitted to a modeling function block 1038 that includes the functionality of GA node 630, ANN node 640, and SVM learning node 654 (all three shown in FIG. 10), and ANN and GA sequence 704 (shown in FIGS. 11 and 12) and SVM learning sequence 706 (shown in FIGS. 11 and 14). Each data cluster 1036 forms a model 1040, wherein each trip has an associated trip model from trip 1 to trip N. Trip models 1040 may be to used to provide information that includes, without limitation, multi-route planning information and trip time estimation.

Figure 17:
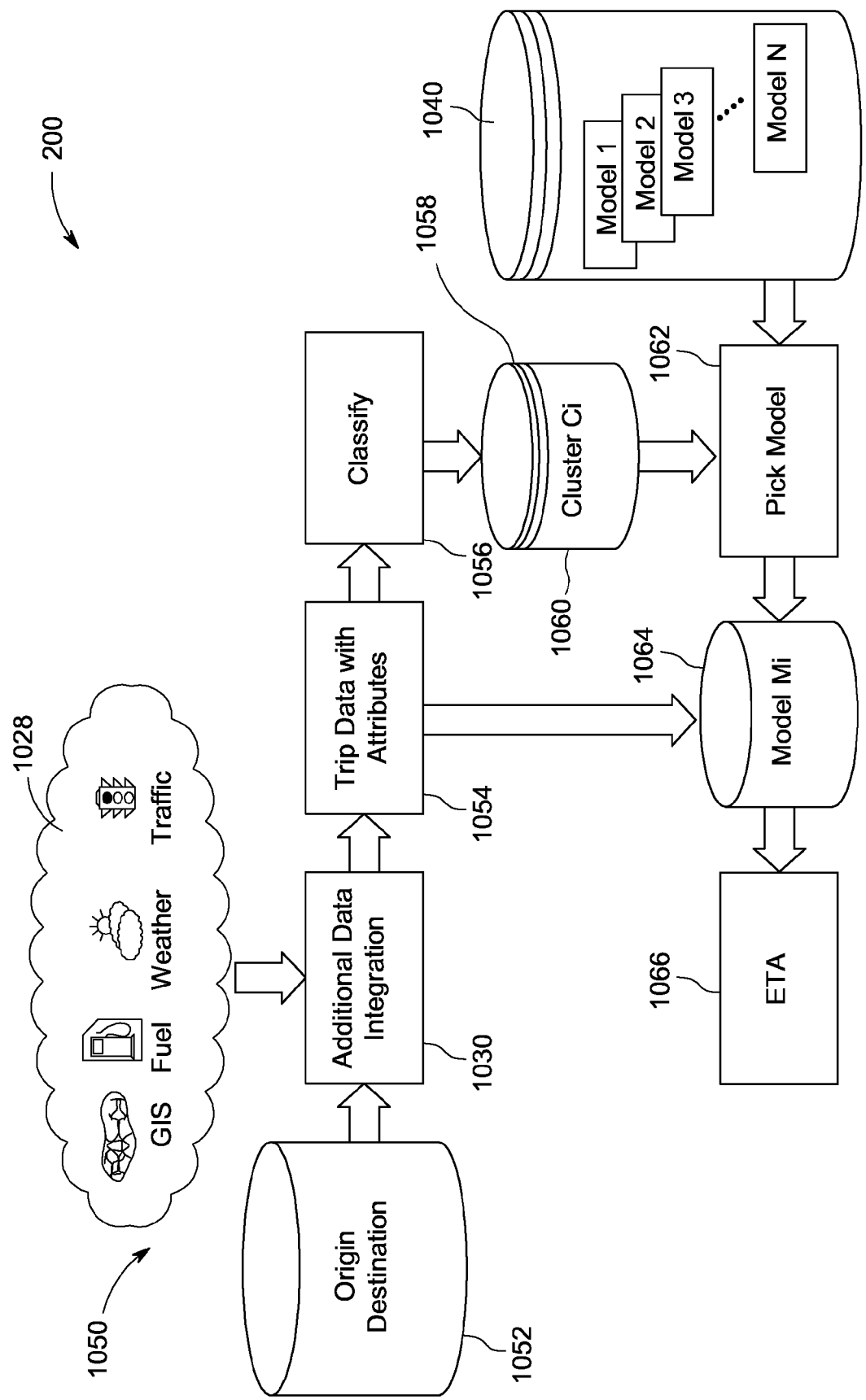
FIG. 17 is a flow chart of an exemplary model of problem solving during derivation of an estimated time of arrival for a route and trip that may be used with the adaptive cognitive system shown in FIG. 2.

FIG. 17 is a flow chart of an exemplary model 1050 of problem solving during derivation of an estimated time of arrival for a route and trip that may be used with the adaptive cognitive system 200. In the exemplary embodiment, origin and destination data 1052 representative of features of the shipping origin and shipping destination, for example, without limitation, latitudes and longitudes. In general, collection of data 1052 uses a focused attention of system 200, such focused attention facilitating robust determinations of accurate ETAs by system 200.

Also, in the exemplary embodiment, external, dynamic, relevant, contextual data 1028 is received by data integration function block 1030. Contextual data 1028 includes, without limitation, real-time data weather and traffic data received from weather service 606 and traffic service 604 (both shown in FIG. 10), geographic information system (GIS) data, and fuel availability and price data. Such contextual data represents at least one peripheral perception feature of system 200, such peripheral perception facilitating robust determinations of accurate ETAs by system 200. Data integration function block 1030 receives contextual data 1028, integrates origin and destination data 1052 with contextual data 1018, and extracts similar features of data 1028 and 1052 to form trip data with attributes 1054. The attributes may include, without limitation, geographical region, time, weather patterns, traffic patterns, and mileage.

Further, in the exemplary embodiment, a classification function block 1056 receives trip data with attributes 1054 and classifies data 1054 according to at least one of such attributes. The classified data is transmitted to a clustering function block 1058 that is similar to clustering function block 1034 (shown in FIG. 16) and generates at least one data cluster $C_i$ 1060, wherein i is any whole number from 1 to N. Data cluster $C_i$ 1060 is transmitted to a model selection function block 1062 that is coupled to storage of trip models 1040. Function block 1062 selects a trip model 1040 most closely associated with data cluster $C_i$ 1060. Selected trip model 1040 and trip data with attributes 1054 are transmitted to a model $M_i$ function block 1064 and an ETA 1066 of the associated shipment is generated.

Figure 18:
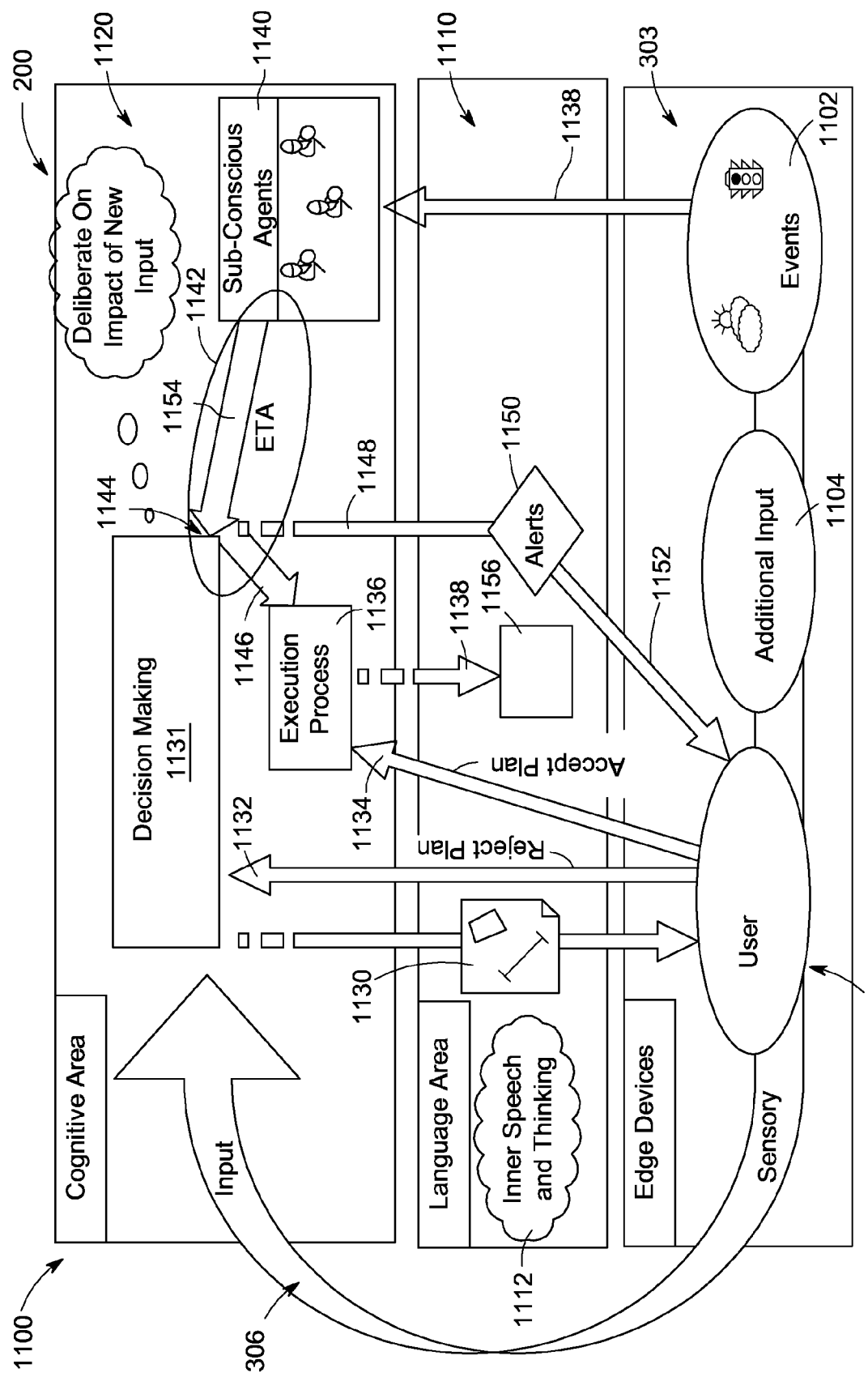
FIG. 18 is a flow chart of an exemplary model of a decision making process that may be used with the adaptive cognitive system shown in FIG. 2.

FIG. 18 is a flow chart of an exemplary model 1100 of a decision making process that may be used with adaptive cognitive system 200. Model 1100 is described in the context of asset management. In the exemplary embodiment, model 1100 includes edge devices 303 that include a plurality of user interfaces 130. At least one of user interfaces 130 includes a planner interface (not shown). The planner interface allows a user, e.g., without limitation, user 125 (shown in FIG. 1) and operators 230 and 235 (human or machine) (both shown in FIG. 2), to specify details about the goods that they are about to ship. Through this interface, they can choose which items they wish to ship, the destinations for those items, the priority of the trip, and other attributes. It is through these attributes that the system chooses a route, and the planner has the ability to accept or reject the given route. After the route has been chosen, the planner will receive updates and alerts about the condition of the cargo.

At least one of user interfaces 130 includes a receiver interface. The receiver interface allows a user, e.g., without limitation, user 125 and human/machine operators 230 and 235, to act as the receiver of the goods being shipped. Through this interface, the receiver can monitor the status of goods being shipped to their destination, and they can also receive alerts about changes in condition of the goods and arrival time of the shipment. Also, through this interface, they will be able to accept or reject the chosen route.

Also, in the exemplary embodiment, edge devices 303 include at least one event interface 1102. Event interface 1102 allows a third user, e.g., without limitation, user 125 and human/machine operators 230 and 235, the ability to interfere with the goods being shipped. The user will be able to add events to the route, which may include weather, traffic, or other conditions. These events will cause the system to "re-think" routes and make decisions during the trip's execution.

Further, in the exemplary embodiment, edge devices 303 include additional data sources 1104 for receipt of contextual data. System 200 has access to such additional data sources 1104 when planning the route. These sources of data can be, but are not limited to, weather, traffic, crime, and maps. These will assist the decision-making ability of the system.

Model 1100 also includes a language area 1110 that facilitates communication between system 200 and real world 304 (shown in FIG. 3), and within system 200 itself to facilitate thinking, imagination, and planning features of system 200. Language area 1110 facilitates use of avatars (not shown) capable of speech to communicate to system users through user interfaces 130. The avatars are also capable of facial expressions and vocal intonations to express emotion. Language area 1110 also facilitates use of communication devices and channels including, without limitation, email, cell phones, collaboration applications, and annunciator systems.

Language area 1110 also facilitates communication with additional data sources 1104, such communication including, without limitation, information requests through search-oriented architectures, queries to the web through web agents, information requests to telematics devices/systems aboard trailers, trucks, and rail cars. Language area 1110 further facilitates two-way communication with warehouse robots (not shown).

In the exemplary embodiment, language area 1110 includes inner speech and thinking features 1112 that facilitate internal data flow within system 200 including, without limitation, data recall from the SDM features of memory sub-module 336 (shown in FIG. 3) and organizing information perceived from real world 304 to solve problems and learn. Inner speech and thinking features 1112 also facilitate inner imagery, emotions, and memory functioning.

Also, in the exemplary embodiment, model 1100 includes a cognitive area 1120 that is closely associated with cognitive module 320 (shown in FIG. 3). Cognitive area 1120 facilitates deliberation and action selection by system 200. For example, in the context of an asset management application, for a number of available inputs, there may be several routes appropriate for the given conditions and destination match-ups. System 200 will choose the routes and/or load orders to suggest to the user.

Cognitive area 1120 also facilitates learning by system 200. For example, in the context of an asset management application, at the planner and receiver interface, system 200 can learn the name of the planner/receiver and the preferences of the planner/receiver using, without limitation, an avatar. Also, system 200 uses additional data sources 1104 to learn from the stream of information coming therefrom and uncover patterns in environmental conditions, e.g., without limitation, weather, traffic, and crime. Further, system 200 may use route-planning system features to learn which routes the customer rejects and build future routes that won't get rejected. Moreover, system 200 facilitates learning by warehouse robots, e.g., without limitation, the layout of the warehouse and the location of goods.

In the context of a supply chain management example, model 1100 facilitates cargo shipments from an origin to a destination. Planners use the planning interface at user interface 130. The planners interact with a system-generated avatar to input the shipments details such as shipping time, shipping method, the origin, the destination. The avatar, in turn, interacts with the planner to verify information and to notify the planner of potential conflicts or inconsistencies.

System 200 requests additional information from the sources at its disposal, including, without limitation, memory sub-module 336 and additional data sources 1104 and transmits all to cognitive area 1120 through sensory input sub-module 306. System 200 proposes an action plan 1130 that includes a proposed route that is transmitted to the planner at user interface 130. In the exemplary embodiment, system 200 executes a pre-trip analysis using its decision making features 1131. For example, system 200 will optimize fuel stops based on current prices. Also, the trip is compared to trips taken in the past, and then clustered with those trips in memory. Further, system 200 is able to learn the time it takes to make a specific trip, and generalize that information to predict the times for novel trips though the development of learned models.

The planner may reject 1132 the plan or accept the plan 1134. If the plan is rejected 1132, system 200 may request additional information from the planner, pull in additional information from sources 1104, and/or propose 1130 a revised or new plan. The accepted plan 1134 is executed through execution process 1136 and action 1138 is performed, i.e., the cargo is loaded and shipped from the origin. At the warehouse, robots execute the load order utilizing technology that includes, without exception, RFID technology to locate the goods in the warehouse, and bring them to a designated area marked as a trailer.

While the shipment is en route, event interface 1102 and/or additional data sources 1104 updates system 200 with respect to the status of the shipment, the shipping means, and the shipping route using transmission of real-time dynamic data 1138 through subconscious agents 1140. The data updates are evaluated by system 200, and new important data 1142 will be evaluated to determine 1144 if any problems presented are easy to solve or hard to solve. Those problems that are easy to solve 1146 will be acted upon independently by system 200. For example, system 200 facilitates in-vehicle decisioning through constant analysis of real-time information including, without limitation, weather, traffic, and the driver's behavior.

Those problems that are hard to solve 1148 will generate an alert 1150 that is transmitted 1152 to the planner and/or the receiver to obtain approval for the revision to the action plan generated by system 200. In the exemplary embodiment, the revision is a revised ETA 1154.

The revisions to the action plan due to dynamic conditions during the execution of the trip exhibit elements of artificial consciousness and general artificial intelligence (AGI). In general, AGI systems are flexible and adapt to changing rules, thereby facilitating adaption to, and learning from, dynamic environments and solving dynamic complex problems. Therefore, since system 200 exhibits elements of consciousness including, without limitation, a degree of self-awareness (system 200 understands the difference between self and non-self), the abilities to learn and adapt from/to its environment, have a general understanding of time (able to play scenes forward and backward in time), incorporate a wide range of background knowledge in its decisions, demonstrate intentionality and resourcefulness, have emotions.

The ability of system 200 to play scenes forward in time is related to the forecasting features of system 200. As described above, system 200 generates a plurality of potential solutions in accordance with at least one predetermined goal of system 200 to ameliorate a dynamically determined condition based on at least one of real-time dynamic contextual data transmitted from at least one dynamic contextual data entity and at least one model formed and stored within system 200. System 200 also generates at least one scenario for each of the solutions defining at least one string of forecasted real world events resulting from implementation of each of the solutions, wherein the forecasted real world events are at least one of possible and probable. System 200 further compares the strings of possible and probable forecasted real world events resulting from the implementation of each of the potential solutions. System 200 also selects at least one course of action from the potential solutions and transmits the at least one directive to at least one operative entity, thereby executing the at least one course of action.

The ability of system 200 to play scenes backward in time is related to the learning features of system 200. System 200 determines a pattern of performance of system 200 by analyzing at least one of historical data and previously generated courses of action. System 200 also determines a pattern of performance by determining at least one real world effect resulting from executing the previously generated courses of action. System 200 may generate an emotional response to the at least one real world effect. System 200 also transmits the pattern of performance to adaptive on-line learning sub-module 340 (shown in FIG. 3). Further, system 200 modifies a model 1040 (shown in FIG. 16). Moreover, system 200 may modify at least one predetermined goal of system 200, may generate at least one new goal, and/or may modify at least one potential solution in accordance with at least one of the modified goal and the new goal. Also, system 200 may modify at least one scenario for the potential solution and/or may generate at least one scenario for the potential solution. Further, system 200 may redefine at least one string of forecasted real world events resulting from actual implementation of each potential solution. Therefore, system 200 may use the learning features to reinforce use of existing courses of action that generate positive results and discourages use of courses of action that generate negative results.

System 200 includes a visual scheduler/execution display 1156 that displays the progress of the shipment as it completes the given route. In addition, display 1156 facilitates demonstrations of system 200 without waiting for the actual trailer to complete the route. Also, display 1156 will display changing conditions as a result of new events that may interfere with the trips, such as weather or traffic. Moreover, system 200 has the ability to carry out "what if?" exercises, i.e., scenarios of future events and actions can be mapped out even if no action is taken.

System 200 will execute a post-trip analysis based on data received, for example, without limitation, reporting based on fuel usage and engine idle time. Also, if either of fuel usage or engine idle time exceeds predetermined parameters, system 200 will store such information and apply it to subsequent similar trips.

System 200 is scalable, i.e., in some alternative embodiments, system 200 may be scaled downward to execute tasks for a larger system. Such a scaled-down system will only require selected data that affects the plan, rather than a continuous stream of data.

The above-described computer-implemented systems with adaptive learning provide a cost-effective method for facilitating increased reliability and decreasing disruptions of enterprise operations. Specifically, the systems and methods described herein provide for flexible and adaptive systems for the solution of highly complex and dynamic problems. The systems and methods described herein initiate, facilitate, and direct physical and tangible effects in the real world through transmission of directives to operative entities in the real world, such directives being a result of either autonomic or cognitive operation. Also, the systems and methods described herein provide for receipt of real world, real-time feedback induced by the directives, including internal data of a feedforward, i.e., anticipatory nature. Further, the systems and methods described herein provide for the systems perceiving an episodic sense of time through perception of events and storing memories of such events. Moreover, the systems and methods described herein provide for distinguishing between positive outcomes and negative outcomes and generating an emotional response to real world effects generated as a result of executing a course of action.

Also, the systems and methods described herein utilize memory in a software-configured SDM configuration that substantially models human memory to facilitate learning, pattern recognition, and self-guided decision capabilities. Further, the systems and methods described herein facilitate adaptive on-line learning through receipt of dynamic contextual data associated with external events and conditions while interacting with the real world and using self-adapting, learning, and problem solving mechanisms. Moreover, the systems and methods described herein facilitate communication between the adaptive cognitive system and other systems and devices to share knowledge and data therebetween.

Furthermore, the systems and methods described herein utilize deliberation to compare potential solutions, select at least one course of action from such potential solutions, and transmit such course of action to generate and transmit directives to operative entities to execute the course of action in the real world.

An exemplary technical effect of the methods and computer-implemented systems described herein includes at least one of (a) enabling initiation of, facilitation of, and direction of physical and tangible effects in the real world through transmission of directives to operative entities in the real world, such directives being a result of either autonomic or cognitive operation; (b) enabling receipt of real world, real-time feedback induced by system-generated directives, including internal data of a feedforward, i.e., anticipatory, nature; (c) enabling the systems' perceiving an episodic sense of time through perception of events and storing memories of such events; (d) enabling the systems to distinguish between positive outcomes and negative outcomes and generate an emotional response to real world effects generated as a result of executing a course of action; (e) enabling the systems to substantially models human memory to facilitate learning, pattern recognition, and self-guided decision capabilities through utilizing memory in a software-configured SDM configuration; (f) enabling the systems to facilitate adaptive on-line learning through receipt of dynamic contextual data associated with external events and conditions while interacting with the real world and using self-adapting, learning, and problem solving mechanisms; (g) enabling communication between the adaptive cognitive system and other systems and devices to share knowledge and data therebetween; and (h) enabling deliberative features of the system to compare potential solutions, select at least one course of action from such potential solutions, and transmit such course of action to generate and transmit directives to operative entities to execute the course of action in the real world.

Exemplary embodiments of computer-implemented systems with adaptive learning features and methods for operating such systems are described above in detail. The computer-implemented systems and methods of operating such systems are not limited to the specific embodiments described herein, but rather, components of systems and/or steps of the methods may be utilized independently and separately from other components and/or steps described herein. For example, the methods may also be used in combination with other enterprise systems and methods, and are not limited to practice with only the asset management and supply chain management systems and methods as described herein. Rather, the exemplary embodiment can be implemented and utilized in connection with many other enterprise applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A computer-implemented system comprising:
an edge module;
at least one input device coupled to said edge module, said at least one input device configured to generate data input signals; and
a cognitive module coupled to said edge module, said cognitive module comprising:
a perception sub-module coupled to said edge module, said perception sub-module configured to receive the data input signals;
a learning sub-module coupled to said perception sub-module, said learning sub-module configured to adaptively learn at least in part utilizing the data input signals;
a memory sub-module configured to store a plurality of models formed within said learning module from a plurality of data clusters formed within said learning module; and
a problem solving sub-module coupled to each of said perception sub-module, said memory sub-module, and said learning sub-module, said problem solving sub-module configured to generate at least one potential solution in accordance with at least one predetermined goal of said system to ameliorate a condition based on at least one of the data input signals transmitted from said perception sub-module and at least one of said plurality of models, wherein said cognitive module further comprises an internal thinking sub-module coupled to said problem solving sub-module said internal thinking sub-module configured to generate at least one scenario defining at least one string of forecasted real world events resulting from implementation of a course of action selected from said at least one potential solution, wherein said forecasted real world events are at least one of possible and probable.

2. The computer-implemented system in accordance with claim 1, wherein said system further comprises an asset management system.

3. The computer-implemented system in accordance with claim 1, wherein said learning sub-module is further configured to:
generate a plurality of data clusters, each of said plurality of data clusters is defined at least in part utilizing at least one attribute; and
form at least one model from at least a portion of said plurality of data clusters.

4. The computer-implemented system in accordance with claim 1, wherein said cognitive module further comprises at least one communication channel coupled to said internal thinking sub-module and coupled to at least one input entity, said at least one communication channel configured to:
transmit real world data to said internal thinking sub-module, wherein at least some of the real world data is static and dynamic data, wherein at least some of the static data is static contextual data and at least some of the dynamic data is dynamic contextual data; and
communicate with other systems to share knowledge and data therebetween.

5. The computer-implemented system in accordance with claim 1, wherein said cognitive module further comprises:
a deliberation sub-module coupled to said problem solving sub-module and said perception sub-module, said deliberation sub-module configured to:
compare a plurality of potential solutions transmitted from said problem solving sub-module; and
select at least one course of action from said plurality of potential solutions, and
an action sub-module coupled to said deliberation sub-module, said action sub-module configured to transmit directives to at least one operative entity to execute said at least one course of action in the real world.

6. The computer-implemented system in accordance with claim 5, wherein:
said perception sub-module is further configured to receive feedback from said at least one input entity;
said learning sub-module is further configured to modify at least one of said plurality of models at least in part utilizing the feedback, thereby defining at least one modified model; and
said problem solving sub-module is further configured to at least one of generate a new solution and modify an existing solution as a function of said at least one modified model.

7. The computer-implemented system in accordance with claim 6, wherein said edge module comprises at least one of:
a sensory input sub-module comprising said at least one input entity;
a reflex sub-module coupled to said sensory input sub-module, said reflex sub-module configured to generate at least one autonomic response to input signals transmitted from said at least one input entity, thereby bypassing said cognitive module; and said action sub-module further coupled to said reflex sub-module, said action sub-module further configured to transmit directives to at least one operative entity to execute at least one predetermined course of action as a function of said at least one autonomic response.

8. The computer-implemented system in accordance with claim 1, wherein said cognitive module further comprises a comparison sub-module and an emotion sub-module, wherein said comparison sub-module, said learning sub-module, and said memory sub-module cooperate to with said emotion sub-module to:

distinguish between positive outcomes and negative outcomes; and modify at least one of said plurality of models based on at least one of the positive outcomes and the negative outcomes.

9. A method of using a computer-implemented system having adaptable cognitive features, said method comprising executing instructions stored on a computer-readable medium comprising:

generating a plurality of potential solutions in accordance with at least one predetermined goal of the computer-implemented system to ameliorate a dynamically determined condition based on at least one of real-time data inputs transmitted from at least one data input entity and at least one model formed and stored within the computer-implemented system;

generating at least one scenario for each of the plurality of solutions defining at least one string of forecasted real world events resulting from implementation of each of the plurality of solutions, wherein the forecasted real world events are at least one of possible and probable;

comparing the strings of possible and probable forecasted real world events resulting from the implementation of each of the plurality of potential solutions to each other;

selecting at least one course of action from the plurality of potential solutions based at least in part on the comparison;

transmitting at least one directive associated with the at least one course of action to at least one operative entity, thereby executing the at least one course of action; and generating an emotional response to real world effects generated as a result of executing the at least one course of action comprising:

distinguishing between at least one positive outcome and at least one negative outcome; and modifying at least one of a plurality of models based at least in part on at least one of the at least one positive outcome and the at least one negative outcome.

10. The method in accordance with claim 9, wherein generating a plurality of potential solutions comprises:

generating a plurality of data clusters, wherein each of the plurality of data clusters is defined at least in part with respect to at least one attribute; and forming at least one model from at least a portion of the plurality of data clusters.

11. The method in accordance with claim 10, wherein forming at least one model comprises forming a plurality of models, said method further comprising:

receiving feedback from at least one input entity, wherein at least a portion of the feedback is real world data, and at least a portion of the real world data is static and dynamic data, wherein at least some of the static data is static contextual data and at least some of the dynamic data is dynamic contextual data;

modifying at least one of the plurality of models based at least in part on the feedback, thereby defining at least one modified model; and at least one of generating a new solution and modifying an existing solution as a function of the at least one modified model.

12. The method in accordance with claim 11 further comprising:

generating at least one autonomic response to the feedback received from the at least one input entity; and transmitting at least one directive to at least one operative entity, thereby executing at least one predetermined course of action as a function of the at least one autonomic response.

\* \* \* \* \*